United States Patent [19]

Tsuruoka

[11] Patent Number: 5,892,850
[45] Date of Patent: Apr. 6, 1999

[54] SIGNAL PROCESSING APPARATUS CAPABLE OF CORRECTING HIGH-FREQUENCY COMPONENT OF COLOR SIGNAL WITH HIGH PRECISION

[75] Inventor: Takao Tsuruoka, Machida, Japan

[73] Assignee: Olympus Optical Co., Ltd., Tokyo, Japan

[21] Appl. No.: 837,922

[22] Filed: Apr. 11, 1997

[30] Foreign Application Priority Data

Apr. 15, 1996 [JP] Japan .................................. 8-092545

[51] Int. Cl.⁶ ...................................................... G06K 9/00
[52] U.S. Cl. ........................................... 382/240; 382/278
[58] Field of Search ..................................... 382/237, 240,
382/278, 248, 233, 246, 270, 254, 232,
274, 234, 235, 239, 244, 251, 276, 281,
275, 163, 167, 166; 704/210, 217, 233;
235/380; 358/457, 459, 262.1; 348/420,
398, 407, 424, 384

[56] References Cited

U.S. PATENT DOCUMENTS

| | | | |
|---|---|---|---|
| 4,401,849 | 8/1983 | Ichikawa et al. | 179/1 SC |
| 5,092,341 | 3/1992 | Kelen | 128/702 |
| 5,384,868 | 1/1995 | Maeda et al. | 382/240 |
| 5,384,869 | 1/1995 | Wilkinson et al. | 382/240 |
| 5,446,806 | 8/1995 | Ran et al. | 382/240 |
| 5,526,438 | 6/1996 | Barton | 382/237 |
| 5,724,451 | 3/1998 | Shin et al. | 382/240 |
| 5,727,089 | 3/1998 | Ray et al. | 382/237 |
| 5,748,787 | 5/1998 | Sugiyama | 382/240 |
| 5,754,702 | 5/1998 | Simpson | 382/240 |

FOREIGN PATENT DOCUMENTS 5-56446  3/1993  Japan .............................. H04N 9/64

Primary Examiner—Leo H. Boudreau
Assistant Examiner—Bijan Tadayon
Attorney, Agent, or Firm—Frishauf, Holtz, Goodman, Langer & Chick

[57] ABSTRACT

A signal processing apparatus processes a signal which has a plurality of spectral sensitivity characteristics and in which the information amount of a signal related to at least one of the spectral sensitivity characteristics is larger than the information amount of any one of signals related to the other spectral sensitivity characteristics. A wavelet transform section resolves the signal of the spectral sensitivity characteristic having a large information amount into high- and low-frequency components. An R- and B-signal correlation coefficient calculating section calculates correlation coefficients between the low-frequency component derived and the signals of the spectral sensitivity characteristics having a small information amount. An R- and B-signal high-frequency creating section creates high-frequency components of the signals of the spectral sensitivity characteristics having a small information amount based on the correlation coefficients derived and the high-frequency component. An R- and B-signal inverse wavelet transform section synthesizes the high-frequency components thus derived and the signals of the spectral sensitivity characteristics having a small information amount to output an output signal with high definition.

9 Claims, 18 Drawing Sheets

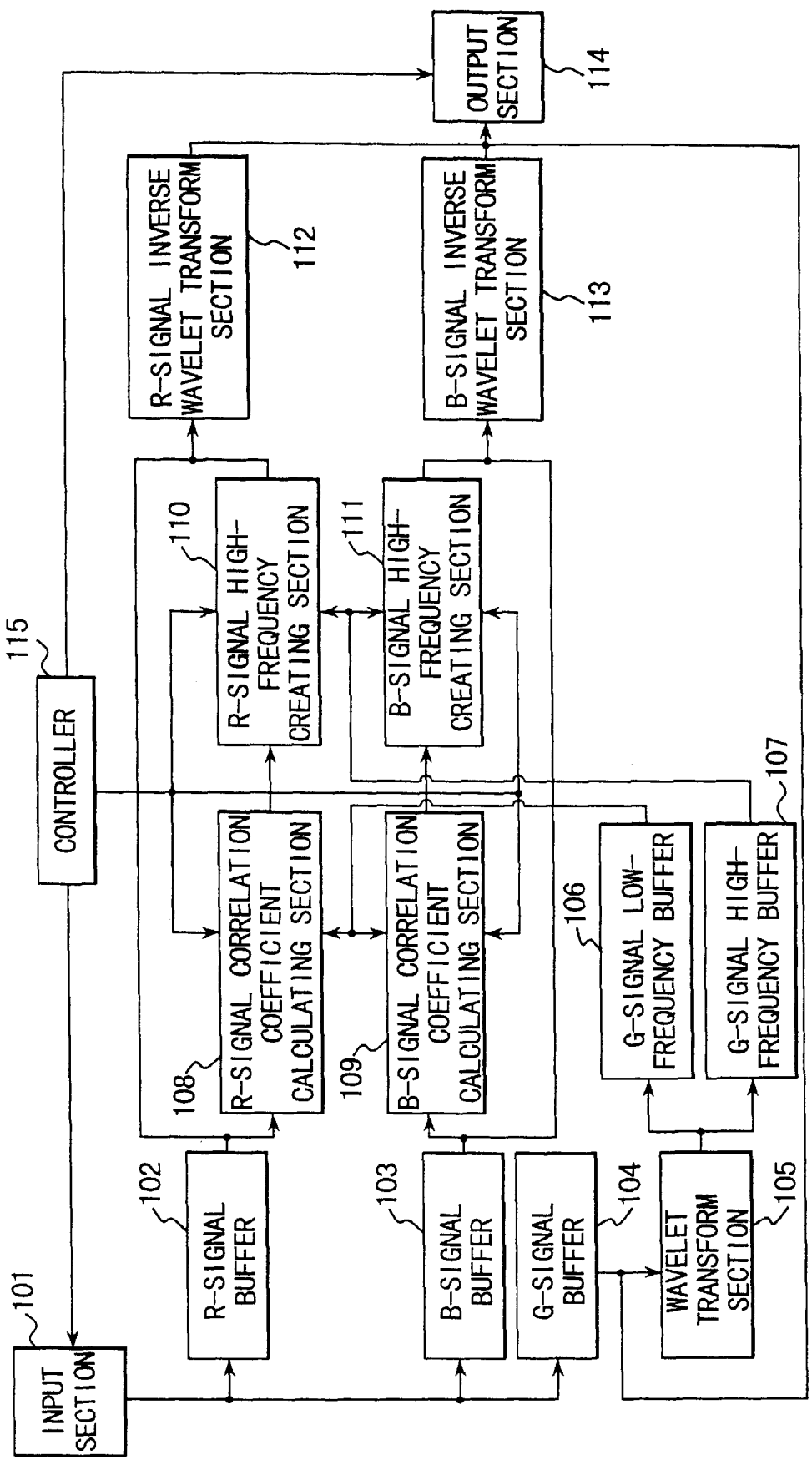
F I G. 1

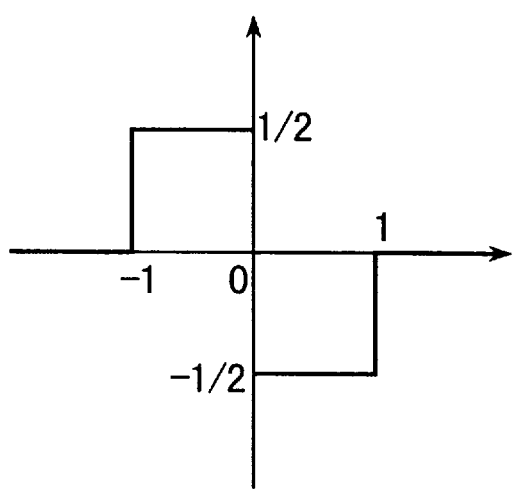 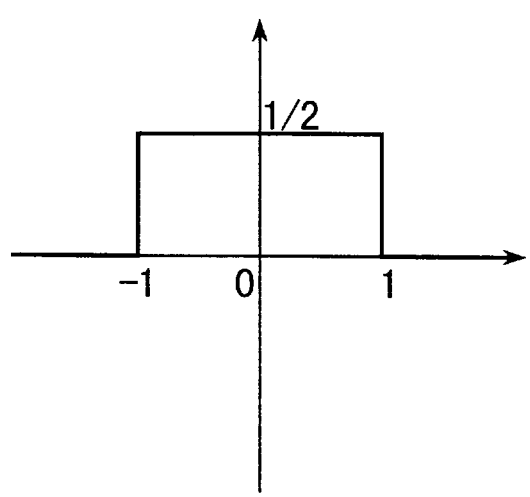
F I G. 4 A          F I G. 4 B

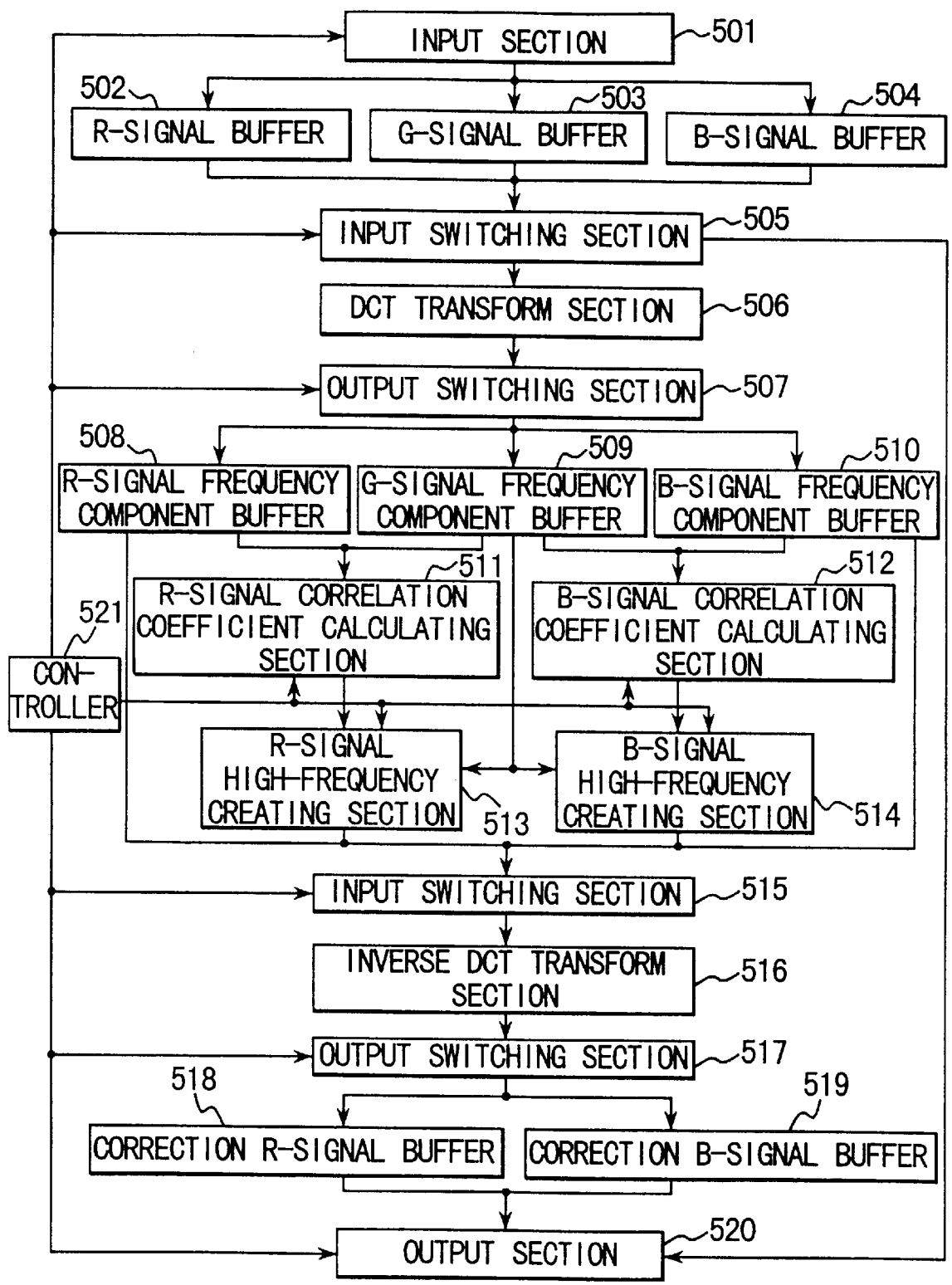
F I G. 7

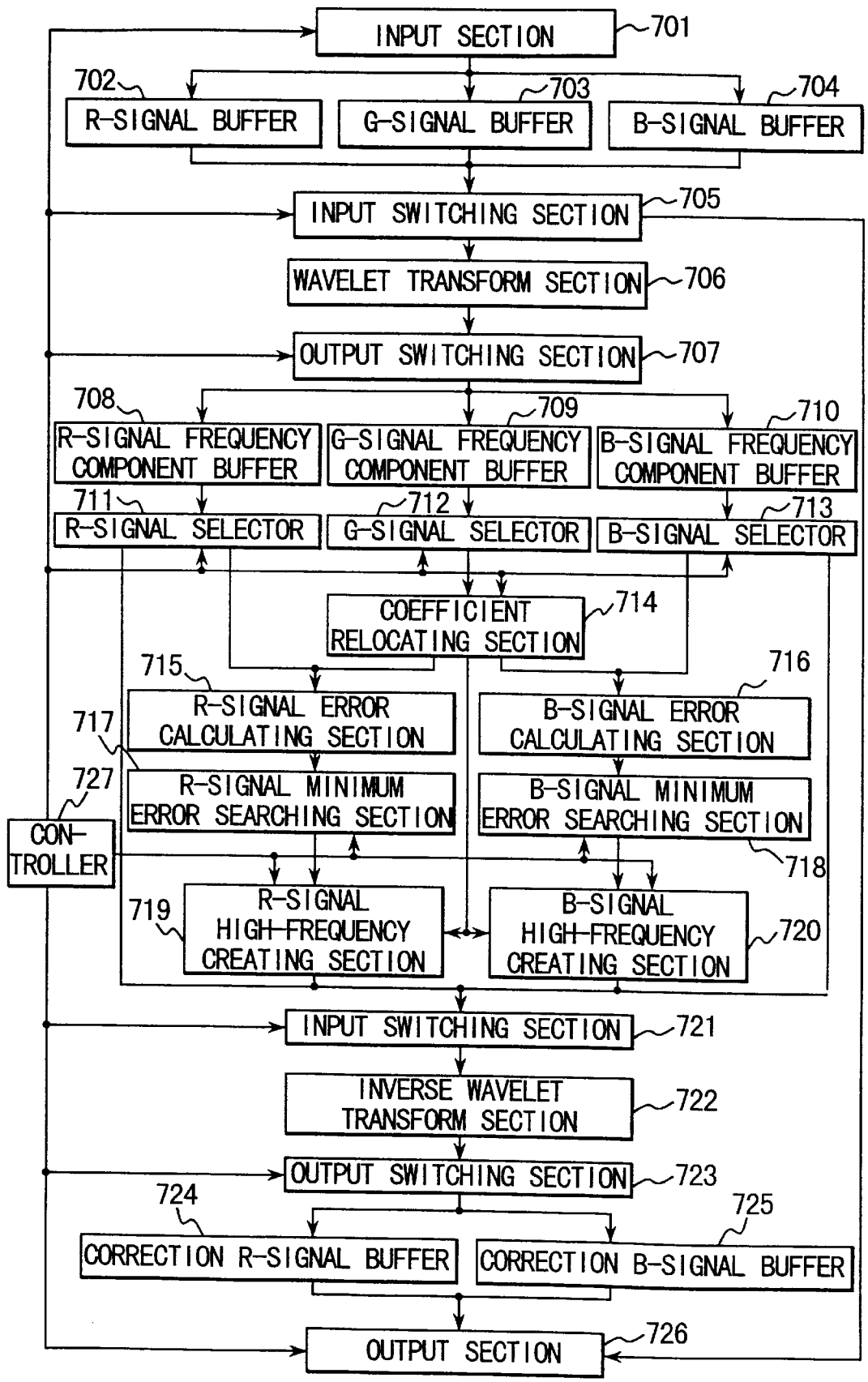
F I G. 10

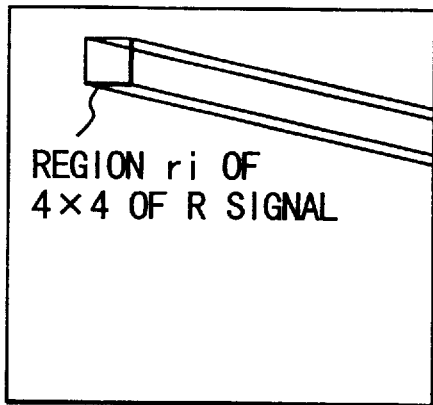
FIG. 11A
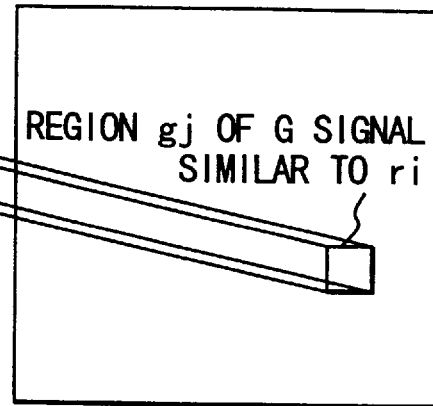
FIG. 11B
FIG. 11C
FIG. 11D

FIG. 12A ROTATION OF 0°

FIG. 12B ROTATION OF 90° $Gm_{LH} \leftrightarrow -Gm_{HL} \cdot -Gm_{HH}$

FIG. 12C ROTATION OF 180° $-Gm_{LH} \cdot -Gm_{HL}$

FIG. 12D ROTATION OF 270° $-Gm_{LH} \leftrightarrow Gm_{HL} \cdot -Gm_{HH}$

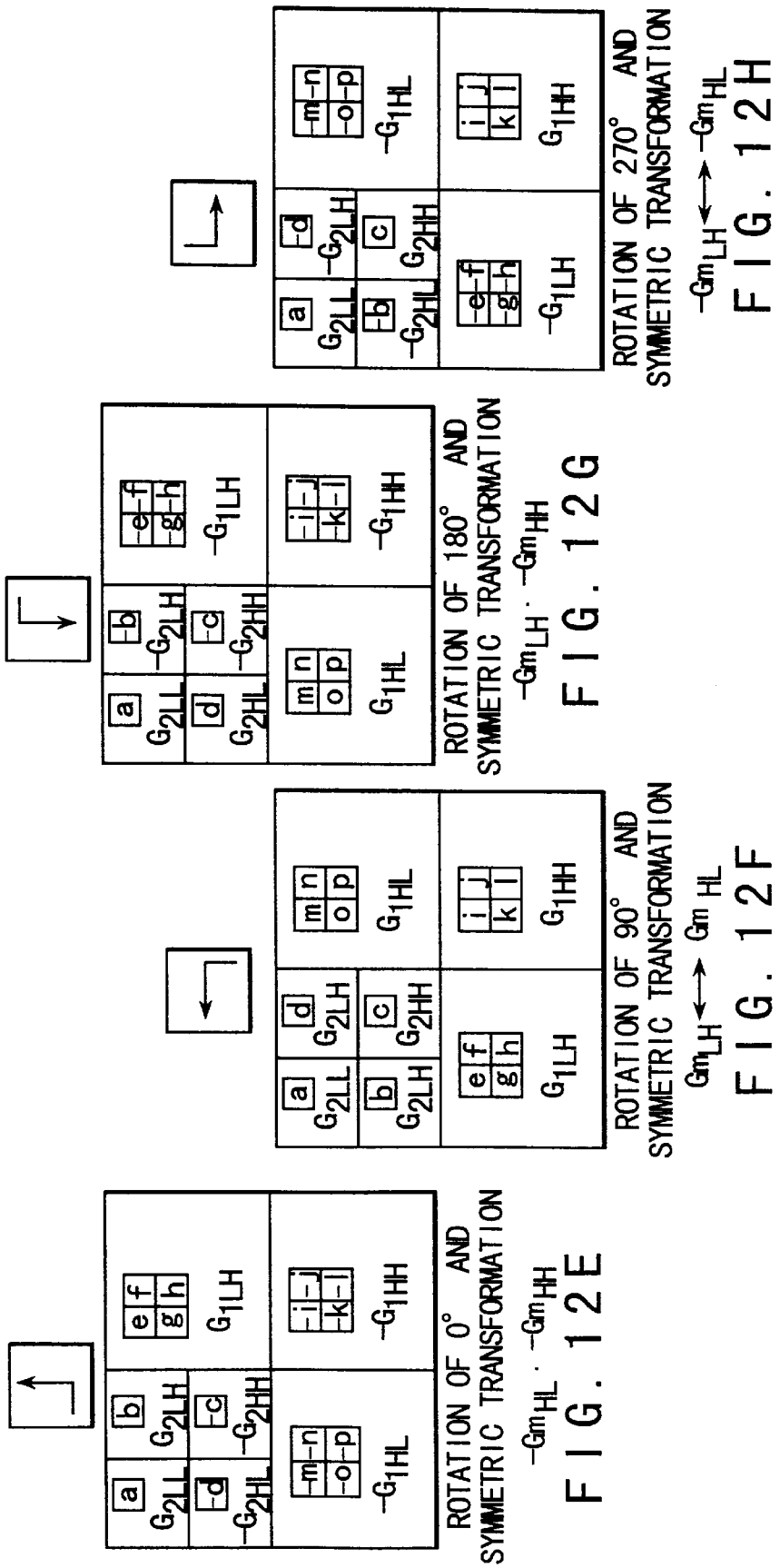

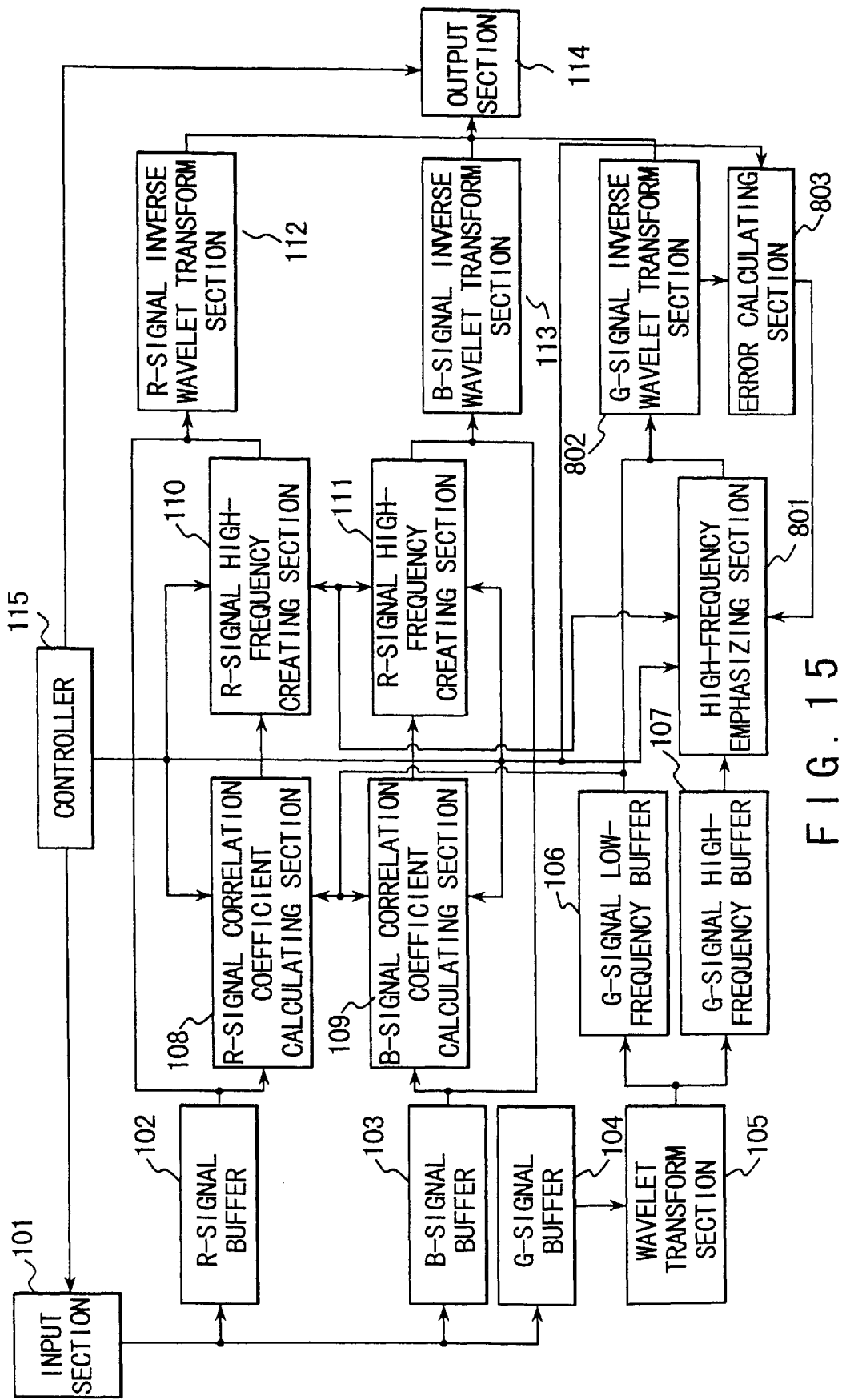
F I G. 15

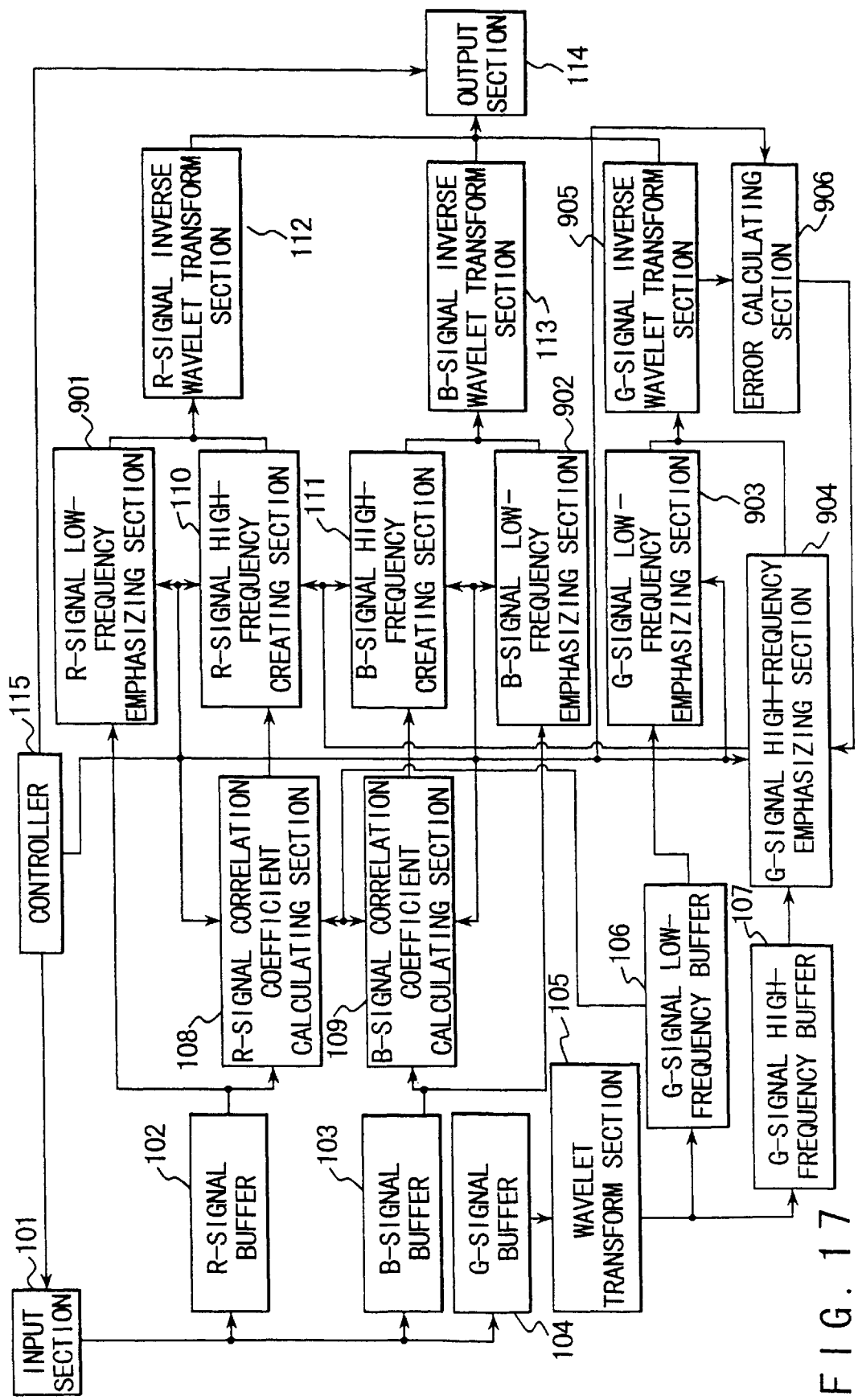
F I G. 17

SIGNAL PROCESSING APPARATUS CAPABLE OF CORRECTING HIGH-FREQUENCY COMPONENT OF COLOR SIGNAL WITH HIGH PRECISION

BACKGROUND OF THE INVENTION

This invention relates to a signal processing apparatus, and more particularly to a signal processing apparatus for frequency-resolving or-decomposing an input signal based on the spectral sensitivity characteristic and deriving a high-definition signal by using the high-frequency component of a signal of a spectral sensitivity characteristic containing a large amount of information to estimate the high-frequency component of a signal of another spectral sensitivity characteristic containing a less amount of information.

Recently, image input devices which are inexpensive and light in weight and each use a single-plate type imaging device are widely used. In the single-plate type imaging device, in order to derive color information of a subject from one sheet of imaging device, color filters are arranged in a mosaic form on the light receiving surface. FIG. 18 shows the arrangement of a complementary color mosaic filter of cyan (Cy), magenta (Mg), yellow (Ye) and green (G) which is generally used.

In FIG. 18, luminance signals and color difference signals for the n-th line and (n+1)th line of an even field are respectively denoted by $Y_{o,n}$, $Y_{o,n+1}$ and $C_{o,n}$, $C_{o,n+1}$. Likewise, luminance signals and color difference signals for the n-th line and (n+1)th line of an odd field are respectively denoted by $Y_{e,n}$, $Y_{e,n+1}$ and $C_{e,n}$, $C_{e,n+1}$. In this case, the above signals can be expressed by the following equations.

$$Y_{o,n}=Y_{o,n+1}=Y_{e,n}C_{e,n+1}=2R+3G+2B \quad (1)$$

$$C_{o,n}=C_{e,n}=2R-G \quad (2)$$

$$C_{o,n+1}=C_{e,n+1}=2B-G \quad (3)$$

Cy, Mg and Ye are expressed by the following equations by use of green (G), red (R) and blue (B).

$$Cy=G+B \quad (4)$$

$$Mg=R+B \quad (5)$$

$$Ye=R+G \quad (6)$$

As indicated by the equation (1), the luminance signals are created on all of the lines in the even field and odd field. However, as indicated by the equations (2) and (3), the two color difference signals are created on every other lines, and lines on which color difference signals are not created are compensated for by interpolation. After this, three primary colors of R, G, B can be derived by performing the matrix operation. In the above method, the color signal has an information amount only half that of the luminance signal.

In Jap. Pat. Appln. KOKAI Publication No. 5-56446, there is disclosed a method for correcting the color difference signals by use of the luminance signal components instead of performing the simple interpolation by use of only the color difference signals as described before. That is, the luminance signal Y and the color difference signal C are processed by use of a low-pass filter to derive low-frequency components $Y_{low}$ and $C_{low}$ and a color signal C' obtained after correction is represented by the low-frequency components as indicated by the following equation.

$$C'=Y(C_{low}/Y_{low}) \quad (7)$$

This means that the color difference signal C' after correction can be replaced by a signal obtained by correcting the luminance signal.

However, first, the above prior art technique only corrects the color signal by linear interpolation or by replacing the same by a signal obtained by correcting the luminance signal and cannot cope with correction of the color signal with high precision.

Second, the above prior art technique only corrects the color signal by interpolating the color signal by use of adjacent color signals or by replacing the same by a signal obtained by correcting the luminance signal on the same coordinate and cannot cope with a case where the continuity of the signal is degraded at the edge portion or the like or where the degree of correlation with the luminance signal is low.

Third, the above prior art technique only corrects the color signal by linear interpolation or by replacing the same by a signal obtained by correcting the luminance signal and cannot cope with a case where a high-frequency component of frequency higher than an input signal is created.

Fourth, the above prior art technique only corrects the color signal by linear interpolation or by replacing the same by a signal obtained by correcting the luminance signal and cannot cope with optimum correction for high- and low-frequency components.

BRIEF SUMMARY OF THE INVENTION

Accordingly, a first object of this invention is to provide a signal processing apparatus capable of correcting a high-frequency component of a color signal with high precision.

A second object of this invention is to provide a signal processing apparatus having a construction in which necessary memory capacity is small and capable of correcting a high-frequency component of a color signal with high precision.

A third object of this invention is to provide a signal processing apparatus capable of correcting a high-frequency component of a color signal even in a case where the continuity of a signal is deteriorated or the degree of correlation is low.

A fourth object of this invention is to provide a signal processing apparatus capable of deriving a visually preferable output signal by creating a high-frequency component of frequency higher than an input signal and enhancing the contrast.

A fifth object of this invention is to provide a signal processing apparatus capable of deriving an output signal with high definition by expanding the dynamic range and enhancing the contrast.

In order to attain the above first object, a signal processing apparatus of this invention for processing a signal in which the information amount of a signal related to at least one of a plurality of spectral sensitivity characteristics is larger than the information amount of any one of signals related to the other spectral sensitivity characteristics, comprising frequency resolving means for resolving the signal of the spectral sensitivity characteristic having a large information amount into high- and low-frequency components; correlation coefficient calculating means for calculating correlation coefficients between the low-frequency component derived from the frequency resolving means and the signals of the spectral sensitivity characteristics having a small information amount; high-frequency creating means for creating high-frequency components of the signals of the spectral sensitivity characteristics having a small information amount based on the correlation coefficients derived from the correlation coefficient calculating means and the high-frequency component derived from the frequency resolving means; and frequency synthesizing means for synthesizing the high-frequency components derived from the high-frequency creating means and the respective signals of the spectral sensitivity characteristics having a small information amount to output an output signal with high definition.

In order to attain the second object, the frequency resolving means and frequency synthesizing means use the wavelet transform or, the orthogonal transform corresponding to one of the DCT transform, Fourier transform and Hadamard transformation for each region of preset size.

In order to attain the third object, a signal processing apparatus of this invention for processing a signal in which the information amount of a signal related to at least one of a plurality of spectral sensitivity characteristics is larger than the information amount of any one of signals related to the other spectral sensitivity characteristics, comprising frequency resolving means for resolving a signal into a plurality of frequency components by using a function with local distribution as a basic function; extraction means for extracting a frequency component corresponding to a first preset region of the signal of the spectral sensitivity characteristic having a large information amount and a frequency component corresponding to a second preset region of the signal of the other spectral sensitivity characteristic having a small information amount from the coefficients of the plurality of frequency components derived from the frequency resolving means; similarity calculating means for calculating the degree of similarity between the frequency components of the first and second preset regions derived from the extraction means; searching means for searching for the first preset region having the highest degree of similarity with respect to the second preset region based on the degree of similarity derived from the similarity calculating means; high-frequency creating means for creating a high-frequency component of the second preset region based on the degree of similarity according to the high-frequency component related to the first preset region derived from the searching means; and frequency synthesizing means for synthesizing the high-frequency component derived from the high-frequency creating means and the signal of the other spectral sensitivity characteristic having a small information amount to output an output signal with high definition.

In order to attain the fourth object, a signal processing apparatus of this invention for processing a signal in which the information amount of a signal related to at least one of a plurality of spectral sensitivity characteristics is larger than the information amount of any one of signals related to the other spectral sensitivity characteristics, comprising frequency resolving means for resolving the signal of the spectral sensitivity characteristic having a large information amount into high- and low-frequency components; high-frequency emphasizing means for multiplying a coefficient $\alpha$ larger than 1 by the high-frequency component resolved by the frequency resolving means; error calculating means for calculating the rate at which a signal obtained by synthesizing the high-frequency component emphasized by the high-frequency emphasizing means and the low-frequency component is set outside a preset range; and control means for controlling the coefficient $\alpha$ based on the result of calculation by the error calculating means.

In order to attain the fifth object, a signal processing apparatus of this invention for processing a signal in which the information amount of a signal related to at least one of a plurality of spectral sensitivity characteristics is larger than the information amount of any one of signals related to the other spectral sensitivity characteristics, comprising frequency resolving means for resolving the signal of the spectral sensitivity characteristic having a large information amount into high- and low-frequency components; reference signal low-frequency emphasizing means for emphasizing the low-frequency component resolved by the frequency resolving means by raising the normalized signal thereof to the $\beta$-th power by use of a coefficient $\beta$; error calculating means for synthesizing the low-frequency component emphasized by the reference signal low-frequency emphasizing means and the high-frequency component and calculating the rate at which the synthesized signal is set outside a preset range; control means for controlling the coefficient $\beta$ based on the result of calculation by the error calculating means; reference signal high-frequency emphasizing means for dividing the high-frequency component resolved by the frequency resolving means into preset regions and multiplying the divided high-frequency component of each region by a coefficient $\gamma$ derived from the coefficient $\beta$ used in the reference signal low-frequency emphasizing means according to a preset relational expression; and dependent signal low-frequency emphasizing means for emphasizing the signal of the spectral sensitivity characteristic having a small information amount by raising the normalized signal thereof to the $\beta$-th power.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing the construction of a signal processing apparatus according to a first embodiment of this invention;

FIGS. 4A and 4B are diagrams for illustrating the Harr function;

FIG. 7 is a diagram showing the construction of a signal processing apparatus according to a second embodiment of this invention;

FIG. 10 is a diagram showing the construction of a signal processing apparatus according to a third embodiment of this invention;

FIGS. 11A to 11D are diagrams for illustrating the similar region searching operation based on frequency components;

FIGS. 12A to 12H are diagrams for illustrating relocation of coefficients;

FIG. 15 is a diagram showing the construction of a signal processing apparatus according to a fourth embodiment of this invention;

FIG. 17 is a diagram showing the construction of a signal processing apparatus according to a fifth embodiment of this invention.

DETAILED DESCRIPTION OF THE INVENTION

Figure 2:
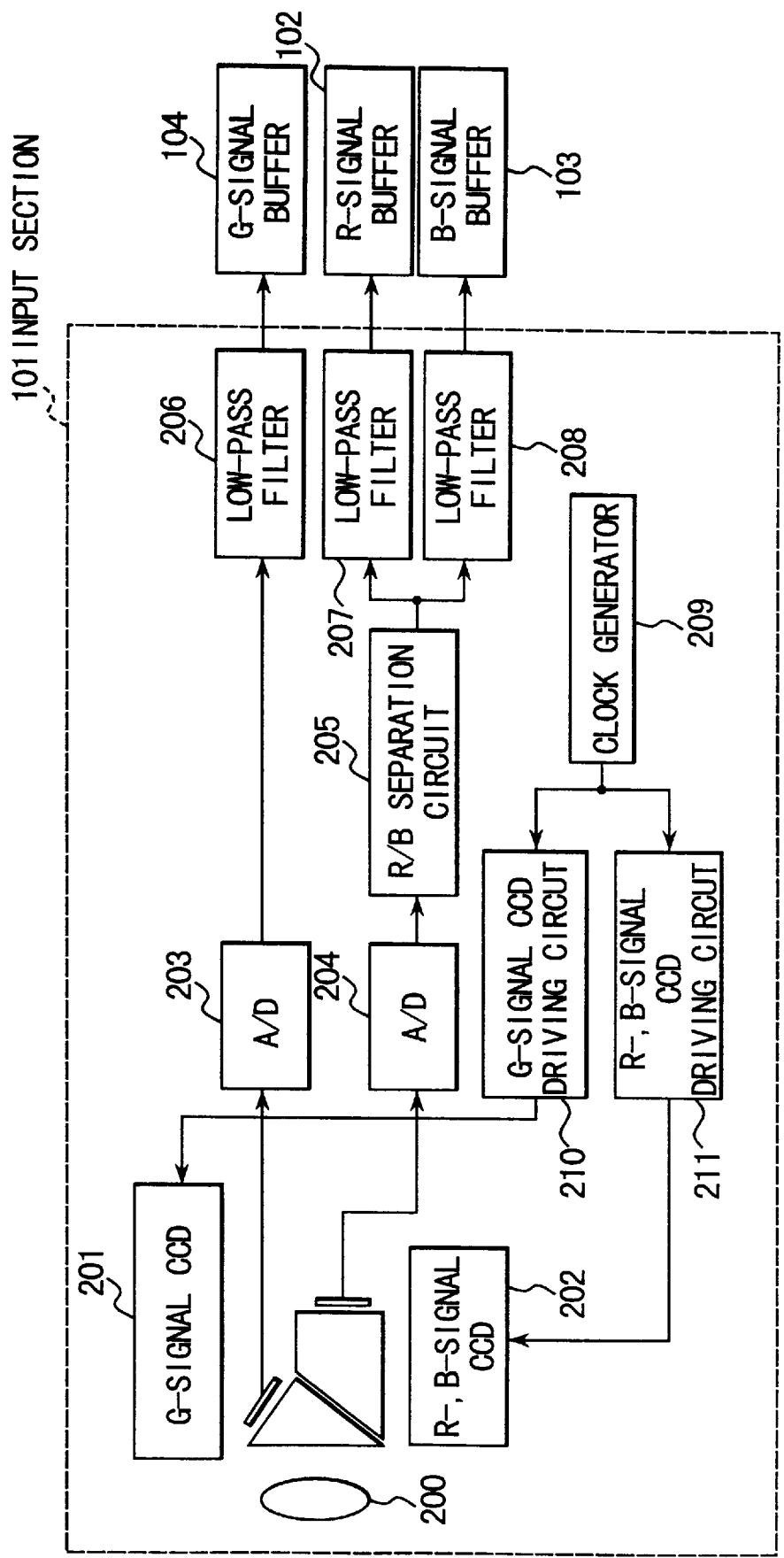
FIG. 2 is a diagram for illustrating a two-plate type CCD input section.

There will now be described an embodiment of this invention in detail with reference to the accompanying drawings.

FIG. 1 is a diagram showing the construction of a signal processing apparatus according to a first embodiment of this invention. In FIG. 1, an input section 101 such as a TV camera is connected to an R-signal buffer 102, B-signal buffer 103 and G-signal buffer 104. An output of the G-signal buffer 104 is connected to a G-signal low-frequency buffer 106 and G-signal high-frequency buffer 107 via a wavelet transform section 105. An output of the G-signal low-frequency buffer 106 is connected to an R-signal correlation coefficient calculating section 108 and B-signal correlation coefficient calculating section 109, and an output of the G-signal high-frequency buffer 107 is connected to an R-signal high-frequency creating section 110 and B-signal high-frequency creating section 111. An output of the R-signal buffer 102 is connected to the R-signal correlation coefficient calculating section 108 and an R-signal inverse wavelet transform section 112 and an output of the B-signal buffer 103 is connected to the B-signal correlation coefficient calculating section 109 and a B-signal inverse wavelet transform section 113.

The R-signal correlation coefficient calculating section 108 is connected to the R-signal high-frequency creating section 110, and the R-signal high-frequency creating section 110 is connected to the R-signal inverse wavelet transform section 112. The B-signal correlation coefficient calculating section 109 is connected to the B-signal high-frequency creating section 111, and the B-signal high-frequency creating section 111 is connected to the B-signal inverse wavelet transform section 113. Outputs of the G-signal buffer 104, R-signal inverse wavelet transform section 112 and B-signal inverse wavelet transform section 113 are connected to an output section 114 such as a magnetic disk. A controller 115 such as a microcomputer is connected to the input section 101, R-signal correlation coefficient calculating section 108, B-signal correlation coefficient calculating section 109, R-signal high-frequency creating section 110, B-signal high-frequency creating section 111, and output section 114.

The operation of the above construction is explained according to the signal flow. Three signals of RGB from the input section 101 are supplied to the R-signal buffer 102, B-signal buffer 103 and G-signal buffer 104 under the control of the controller 115. A G-signal in the G-signal buffer 104 is supplied to the wavelet transform section 105 and subjected to the wavelet transformation by use of a preset basic function, for example, Harr function. A low-frequency component after the transformation is supplied to the G-signal low-frequency buffer 106 and a high-frequency component is supplied to the G-signal high-frequency buffer 107.

The R-signal correlation coefficient calculating section 108 calculates a color correlation coefficient between low-frequency components of an R-signal in the R-signal buffer 102 and a G-signal in the G-signal low-frequency buffer 106. Likewise, the B-signal correlation coefficient calculating section 109 calculates a color correlation coefficient between low-frequency components of a B signal in the B-signal buffer 103 and a G-signal in the G-signal low-frequency buffer 106. The thus calculated color correlation coefficients are respectively supplied to the R-signal high-frequency creating section 110 and B-signal high-frequency creating section 111 and multiplied by the high-frequency component of the G-signal in the G-signal high-frequency buffer 107 so as to synthesize high-frequency components of R-and B signals.

The R-signal inverse wavelet transform section 112 performs the inverse wavelet transformation based on the R-signal (low-frequency component) in the R-signal buffer 102 and the high-frequency component of the R-signal synthesized in the R-signal high-frequency creating section 110 and then supplies an R-signal of high definition to the output buffer 114. Likewise, the B-signal inverse wavelet transform section 113 performs the inverse wavelet transformation based on the B signal (low-frequency component) in the B-signal buffer 103 and the high-frequency component of the B signal synthesized in the B-signal high-frequency creating section 111 and then supplies a B signal of high definition to the output buffer 114. Further, the G-signal in the G-signal buffer 104 is also supplied to the output section 114, and as a result, three signals of RGB are output from the output section 114.

FIG. 2 is a diagram showing one example of the concrete construction of the input section 101 of FIG. 1. As shown in FIG. 2, a G-signal CCD 201 and R-, B-signal CCD 202 are arranged to face an optical system 200. In the following description, it is assumed that the number of pixels of the G-signal is s×s and the number of pixels of each of the R-signal and B signal is s/2×s/2. An output from the G-signal CCD 201 is stored into the G-signal buffer 104 via an A/D 203 and low-pass filter 206 as a digital signal GOLL with the size of s×s. An output from the R-, B-signal CCD 202 is separated by an A/D 204 and R/B separation circuit 205 and then the R-signal is supplied to the R-signal buffer 102 via a low-pass filter 207 as a digital signal $R_{1LL}$ with the size of s/2×s/2. The B signal is supplied to the B-signal buffer 103 via a low-pass filter 208 as a digital signal $B_{1LL}$ with the size of s/2×s/2. The G-signal CCD 201 and R-, B-signal CCD 202 are respectively connected to a G-signal CCD driving circuit 210 and R-, B-signal CCD driving circuit 211 which are operated by a clock from a clock generator 209.

Figure 3:
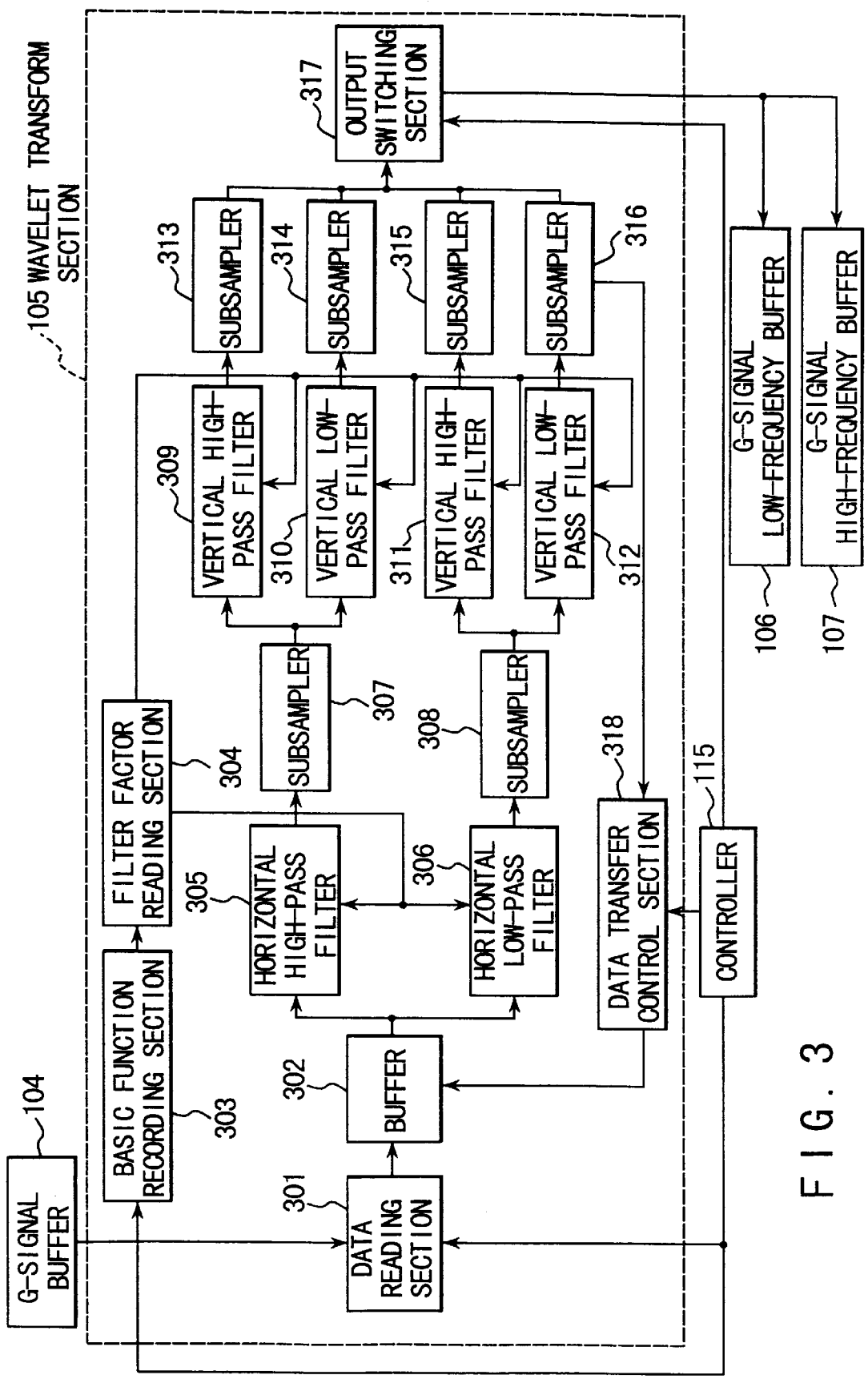
FIG. 3 is a diagram showing the construction of a wavelet transform section.

FIG. 3 is a diagram for illustrating one example of the concrete construction of the wavelet transform section 105 of FIG. 1. As shown in FIG. 3, in a basic function recording section 303, information of general-purpose basic function such as the Harr function is recorded. FIGS. 4A, 4B are diagrams for illustrating the Harr function used as the basic function. The Harr function can be provided by use of a high-pass filter shown in FIG. 4A and a low-pass filter shown in FIG. 4B. The filters are defined by the following equations. The filters are commonly used in the horizontal and vertical directions.

Horizontal, Vertical High-Pass Filter={0.5, −0.5}

Horizontal, Vertical Low-Pass Filter={0.5, 0.5} (8)

A filter factor reading section 304 reads a filter factor of a preset basic function from the basic function recording section 303 under the control of the controller 115 and supplies the thus read filter factor to a horizontal high-pass filter 305, horizontal low-pass filter 306, vertical high-pass filter 309, vertical low-pass filter 310, vertical high-pass filter 311, and vertical low-pass filter 312. A data reading section 301 reads a signal $G_{OLL}$ in the G-signal buffer 104 and transfers the same to a buffer 302 under the control of the controller 115. Data in the buffer 302 is subjected to the multi-stage filtering process as shown in FIG. 3 and is finally output to the G-signal low-frequency buffer 106 and G-signal high-frequency buffer 107 via an output switching section 317.

Subsamplers 307, 308, 313, 314, 315, 316 have functions of subsampling input data to halve the input data number. An output of the subsampler 313 gives a high-frequency component in both of the horizontal and vertical directions, an output of the subsampler 314 gives a high-frequency component in the vertical direction, an output of the subsampler 315 gives a high-frequency component in the horizontal direction, and an output of the subsampler 316 gives a low-frequency component. A data transfer control section 318 transfers an output of the subsampler 316 to the buffer 302 by a preset number of times under the control of the controller 115 and subjects the same to the filtering process again. Thus, expansion coefficients for respective frequencies can be gradually calculated. In this embodiment, since it is assumed that the size of the G-signal is s×s and the size of the R-signal and B signal is s/2×s/2, the filtering process is effected once for the G-signal. The number of transformation processes is determined such that the low-frequency after the transformation comes to have the same size as the R-signal and B signal. The output switching section 317 selectively supplies outputs $G_{1HH}$, $G_{1HL}$, $G_{1LH}$ of the subsamplers 313, 314, 315 to the G-signal high-frequency buffer 107 and supplies an output $G_{1LL}$ of the subsampler 316 to the G-signal low-frequency buffer 106 under the control of the controller 115.

Figure 5:
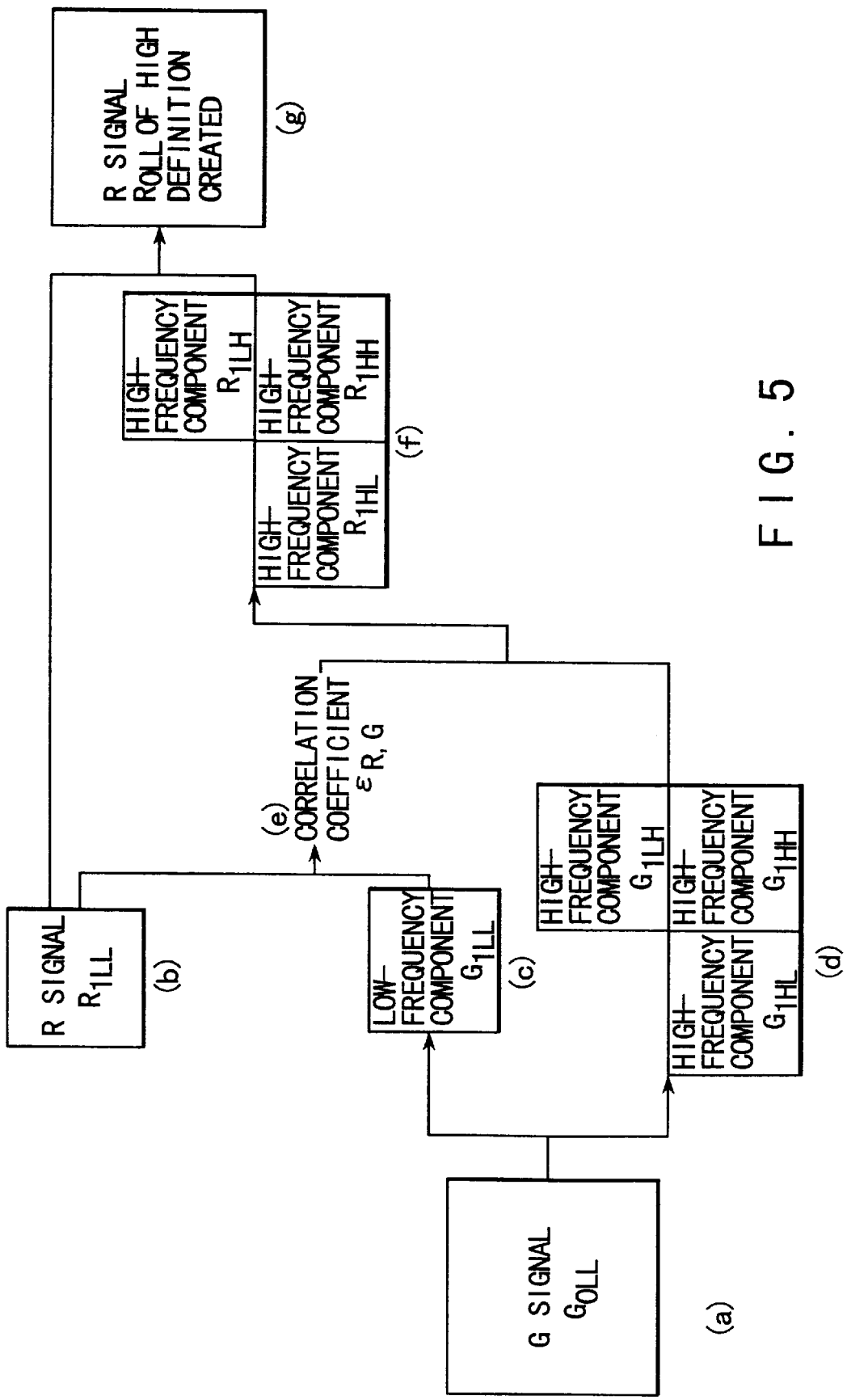
FIG. 5 is a diagram for illustrating the signal processing operation in the first embodiment.

FIG. 5 is a diagram for illustrating the above signal processing operation. In FIG. 5, the signal processing only relating to the R-signal and G-signal is shown, but the signal processing relating to the B signal and G-signal is substantially the same. In FIG. 5, (a) and (b) indicate a signal $G_{OLL}$ on the G-signal buffer 104 and a signal $R_{1LL}$ on the R-signal buffer 102. Further, (c) and (d) in FIG. 5 indicate a signal $G_{1LL}$ on the G-signal low-frequency buffer 106 and signals $G_{1HH}$, $G_{1HL}$, $G_{1LH}$ on the G-signal high-frequency buffer 107 which are subjected to the frequency resolving (decomposing) process in the wavelet transform section 105. In this case, $R_{1LL}$ in (b) and $G_{1LL}$ in (c) of FIG. 5 are data of the same size. The R-signal correlation coefficient calculating section 108 shown in FIG. 1 calculates a correlation coefficient expressed by the following equation between the signal $G_{1LL}$ and the signal $R_{1LL}$.

$$\epsilon_{G,R}(i) = \begin{cases} G_{1LL}(i)/R_{1LL}(i) & R_{1LL}(i) \neq 0 \\ 0 & R_{1LL}(i) = 0 \end{cases} \quad (9)$$

where i indicates the coordinate of data of the signal $R_{1LL}$ and the signal $G_{1LL}$. That is, the correlation coefficient $\epsilon_{G,B}$ is calculated between the signal $G_{1LL}$ and the signal $R_{1LL}$ on the same coordinate for each pixel unit. The correlation coefficient is supplied to the R-signal high-frequency creating section 110 and multiplied by the signals $G_{1HH}$, $G_{1HL}$, $G_{1LH}$ on the G-signal high-frequency buffer 107 to create R-signal high-frequency components $R_{1HH}$, $R_{1HL}$, $R_{1LH}$ shown in (f) of FIG. 5.

$$R_{1HH}(i) = \epsilon_{G,R}(i) G_{1HH}(i)$$
$$R_{1HL}(i) = \epsilon_{G,R}(i) G_{1HL}(i)$$
$$R_{1LH}(i) = \epsilon_{G,R}(i) G_{1LH}(i) \quad (10)$$

In FIG. 5, (g) indicates an R-signal $R_{OLL}$ of high definition calculated by subjecting the high frequency components $R_{1HH}$, $R_{1HL}$, $R_{1HL}$ created in the R-signal high-frequency creating section 110 and the signal $R_{1LL}$ on the R-signal buffer 102 to the inverse wavelet transform in the R-signal inverse wavelet transform section 112.

Figure 6:
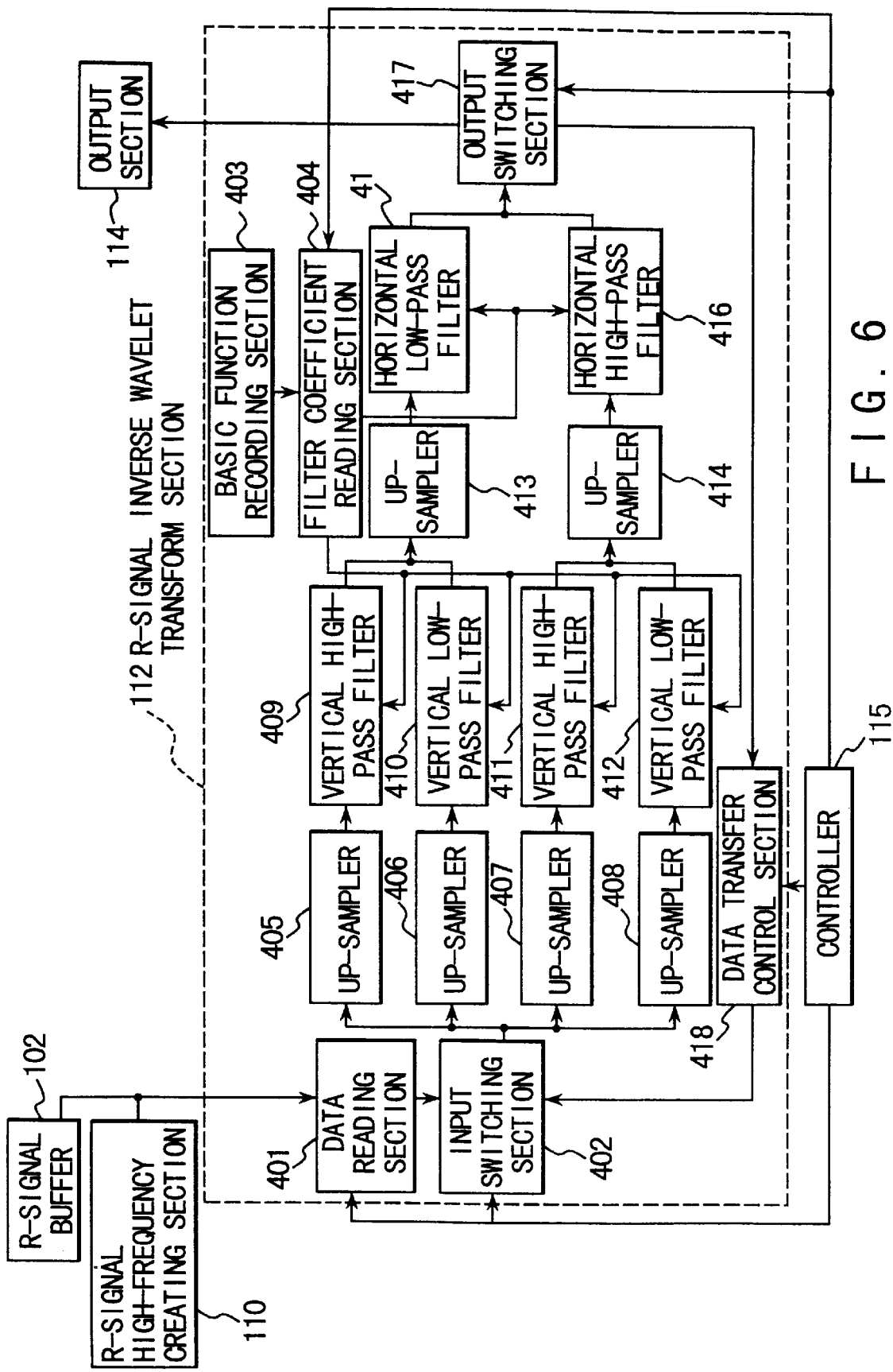
FIG. 6 is a diagram showing the construction of an inverse wavelet transform section.

FIG. 6 is a diagram showing one example of the concrete construction of the R-signal inverse wavelet transform section 112. In FIG. 6, the R-signal inverse wavelet transform section 112 is shown but the B-signal inverse wavelet transform section 113 can be formed with the same construction as that shown in FIG. 6. In a basic function recording section 403, information of general-purpose basic function such as the Harr function is recorded. Filter information items used in the wavelet transform section 105 and the R-signal inverse wavelet transform section 112 are the same. The high-pass filter in the wavelet transform is set to g(n) and the low-pass filter is set to h(n), and the high-pass filter in the inverse wavelet transform is set to g'(n) and the low-pass filter is set to h'(n). Then, the relations of g'(n)=g(−n) and h'(n)=h(−n) are set between them in the case of orthogonal wavelet and can be derived from the filter information of wavelet transform.

A filter coefficient reading section 404 reads a filter coefficient of a preset basic function and supplies the same to a vertical high-pass filter 409, vertical low-pass filter 410, vertical high-pass filter 411, vertical low-pass filter 412, horizontal low-pass filter 415, horizontal high-pass filter 416 under the control of the controller 115. A data reading section 401 and input switching section 402 transfer data from the R-signal buffer 102 and R-signal high-frequency creating section 110 to the respective filters under the control of the controller 115. As shown in FIG. 6, the data is subjected to the multi-stage filtering process and the result of the filtering process is finally output to the output section 114 or data transfer control section 418 via an output switching section 417.

Up-samplers 405, 406, 407, 408, 413, 414 have a function of up-sampling input data to double the input data number. The controller 115 controls the data transfer control section 418 to transfer an output of the output switching section 417 to the input switching section 402 by a preset number of times and subjects the same to the filtering process again. Thus, an image is gradually re-constructed. In this embodiment, since it is assumed that the size of the G-signal is s×s and the size of the R-signal and B signal is s/2×s/2, the filtering process is effected once. In FIG. 5, (g) indicates a reproduced image re-constructed by performing the inverse wavelet transform.

As described above, in the first embodiment, a G-signal having the largest number of pixels among the input signals is resolved into a high-frequency component and low-frequency component by the wavelet transform, the correlation coefficients with the other signals are derived by use of the above low-frequency component, and high-frequency components of the other signals are derived by multiplying the thus obtained correlation coefficients by the high-frequency component of the G-signal. At this time, since the original low-frequency component of each signal is used as it is and the high-frequency component is added adaptively, that is, it is added while controlling a high-frequency component to be created for each pixel unit, the high-frequency component of a color signal can be corrected with high precision, thereby making it possible to derive an output image of high definition with less errors.

Further, since the wavelet transform shares information of neighboring pixels, a reproduced image of high quality which is excellent in the continuity can be obtained even if the high-frequency component is controlled for each pixel unit.

Next, a second embodiment of this invention is explained. FIG. 7 is a diagram showing the construction of the second embodiment. In FIG. 7, an input section 501 such as a TV camera is connected to an input switching section 505 via an R-signal buffer 502, G-signal buffer 503 and B-signal buffer 504. An output of the input switching section 505 is directly connected to an output section 520 and connected to an R-signal frequency component buffer 508, G-signal frequency component buffer 509 and B-signal frequency component buffer 510 via a DCT transform section 506 and output switching section 507. An output of the R-signal frequency component buffer 508 is connected to an R-signal correlation coefficient calculating section 511 and input switching section 515, an output of the G-signal frequency component buffer 509 is connected to the R-signal correlation coefficient calculating section 511, B-signal correlation coefficient calculating section 512, R-signal high-frequency creating section 513 and B-signal high-frequency creating section 514, and an output of the B-signal frequency component buffer 510 is connected to a B-signal correlation coefficient calculating section 512 and input switching section 515.

Further, outputs of the R-signal high-frequency creating section 513 and B-signal high-frequency creating section 514 are connected to a correction R-signal buffer 518 and correction B-signal buffer 519 via the input switching section 515, inverse DCT transform section 516 and output switching section 517. The correction R-signal buffer 518 and correction B-signal buffer 519 are connected to the output section 520 such as a magnetic disk. Further, a controller 521 such as a microcomputer is connected to the input section 501, input switching section 505, output switching section 507, R-signal correlation coefficient calculating section 511, B-signal correlation coefficient calculating section 512, R-signal high-frequency creating section 513, B-signal high-frequency creating section 514, input switching section 515, output switching section 517 and output section 520.

The operation of the above construction is explained according to the signal flow. In FIG. 7, three signals of RGB from the input section 501 are supplied to the R-signal buffer 502, G-signal buffer 503 and B-signal buffer 504 under the control of the controller 521. Signals in the respective buffers are sequentially supplied for each region of preset size to the DCT transform section 506 via the input switching section 505 and subjected to the frequency resolving process. In this embodiment, the preset size is set to 8×8 as one example. The regions are set so as not to overlap each other and signals on the same coordinate are supplied to the DCT transform section 506 in the order of RGB.

In the DCT transform section 506, the DCT transform which is well known in the art is performed and an output thereof is sequentially transferred to the R-signal frequency component buffer 508, G-signal frequency component buffer 509 and B-signal frequency component buffer 510 via the output switching section 507 under the control of the controller 521. The R-signal correlation coefficient calculating section 511 calculates a correlation coefficient between preset low-frequency components, for example, low-frequency components of 2×2 size of the R-signal frequency component buffer 508 and G-signal frequency component buffer 509. Likewise, the B-signal correlation coefficient calculating section 512 calculates a correlation coefficient between low-frequency components of the B-signal frequency component buffer 510 and G-signal frequency component buffer 509. The correlation coefficients are respectively supplied to the R-signal high-frequency creating section 513 and B-signal high-frequency creating section 514 and multiplied by the high frequency component of the G-signal frequency component buffer 509 to synthesize the high-frequency components of the R-signal and B-signal. The high-frequency components indicate frequency components except the low-frequency components of 2×2 size.

The high-frequency components created in the R-signal high-frequency creating section 513 and B-signal high-frequency creating section 514 and the low-frequency components in the R-signal frequency component buffer 508 and B-signal frequency component buffer 510 are supplied to the input switching section 515. The input switching section 515 transfers the high-frequency component and low-frequency component of the R-signal to the inverse DCT transform section 516 under the control of the controller 521 and then transfers the high-frequency component and low-frequency component of the B signal to the inverse DCT transform section 516. In the inverse DCT transform section 516, the inverse DCT transform which is well known in the art is performed and an output signal thereof is transferred to the correction R-signal buffer 518 and correction B-signal buffer 519 via the output switching section 517 under the control of the controller 521. The input switching section 505 is connected to the output section 520 and a G-signal of the G-signal buffer 503 is output to the output section 520. To the output section 520, the RGB three signals from the correction R-signal buffer 518, input switching section 505 and correction B-signal buffer 519 are sequentially supplied under the control of the controller 521.

Figure 8:
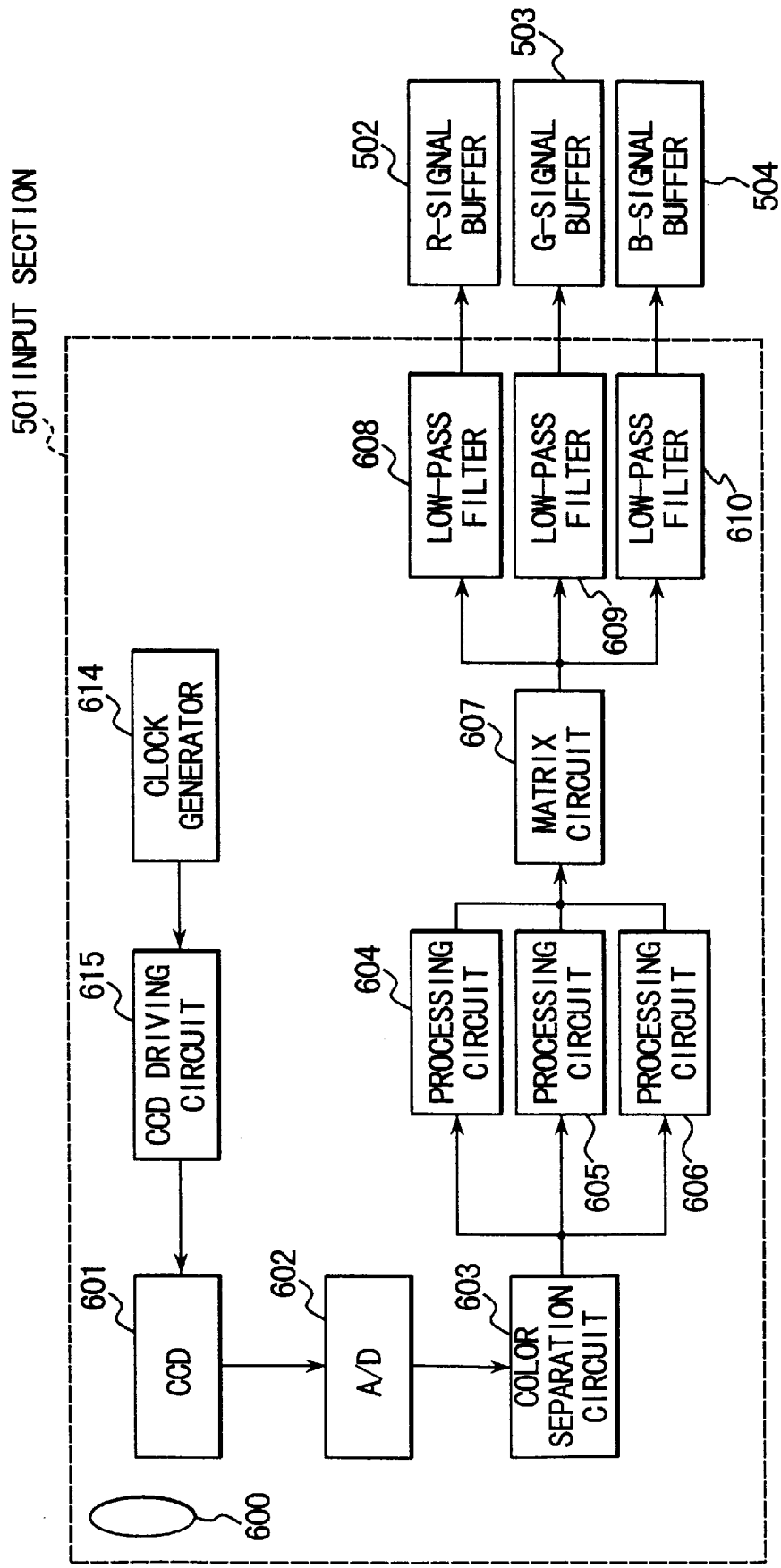
FIG. 8 is a diagram for illustrating a single-plate type CCD input section.
Figure 18:
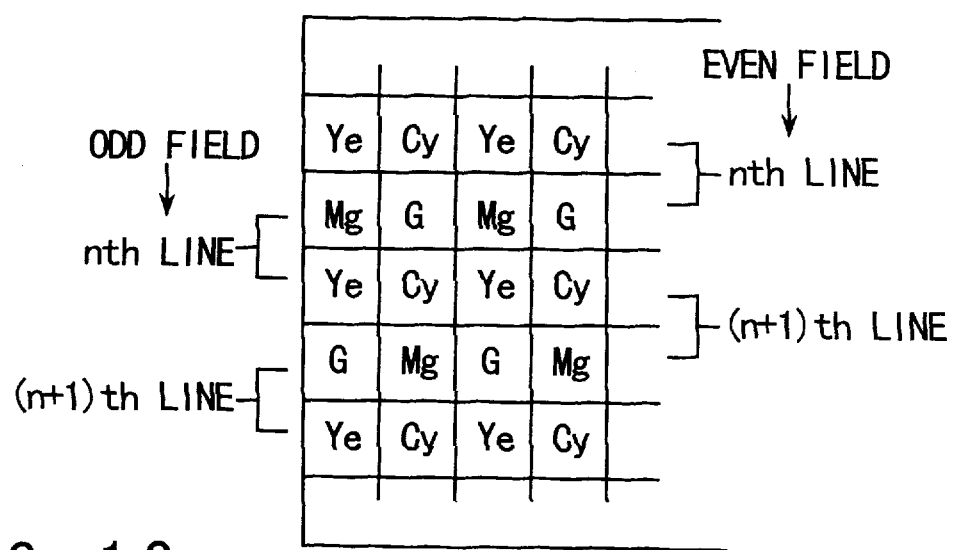
FIG. 18 is a diagram showing the filter arrangement of a single-plate type imaging device.

FIG. 8 is a diagram showing an example of the concrete construction of the input section 501. A single-plate CCD 601 is arranged to face an optical system 600. The single-plate CCD 601 is a complementary color type CCD as shown in FIG. 18, for example. An output signal from the single-plate CCD 601 is separated into a luminance signal and two color difference signals indicated by the equations (1), (2) and (3) in a color separation circuit 603 via an A/D 602. The separated signals are processed in processing circuits 604, 605, 606, converted into three signals of RGB via a matrix circuit 607 and low-pass filters 608, 609, 610, and stored into the R-signal buffer 502, G-signal buffer 503, B-signal buffer 504. Further, a CCD driving circuit 615 operated by a clock from a clock generator 614 is connected to the CCD 601. The three signals of RGB obtained here have the same size, and the G-signal corresponding to the luminance signal is a signal having a large number of pixels of the imaging device and containing a plenty of high-frequency components. Since the other R-and B signals are derived from the color difference signals having a less number of pixels of the imaging device, they are obtained as signals having an insufficient amount of high-frequency components.

Figure 9:
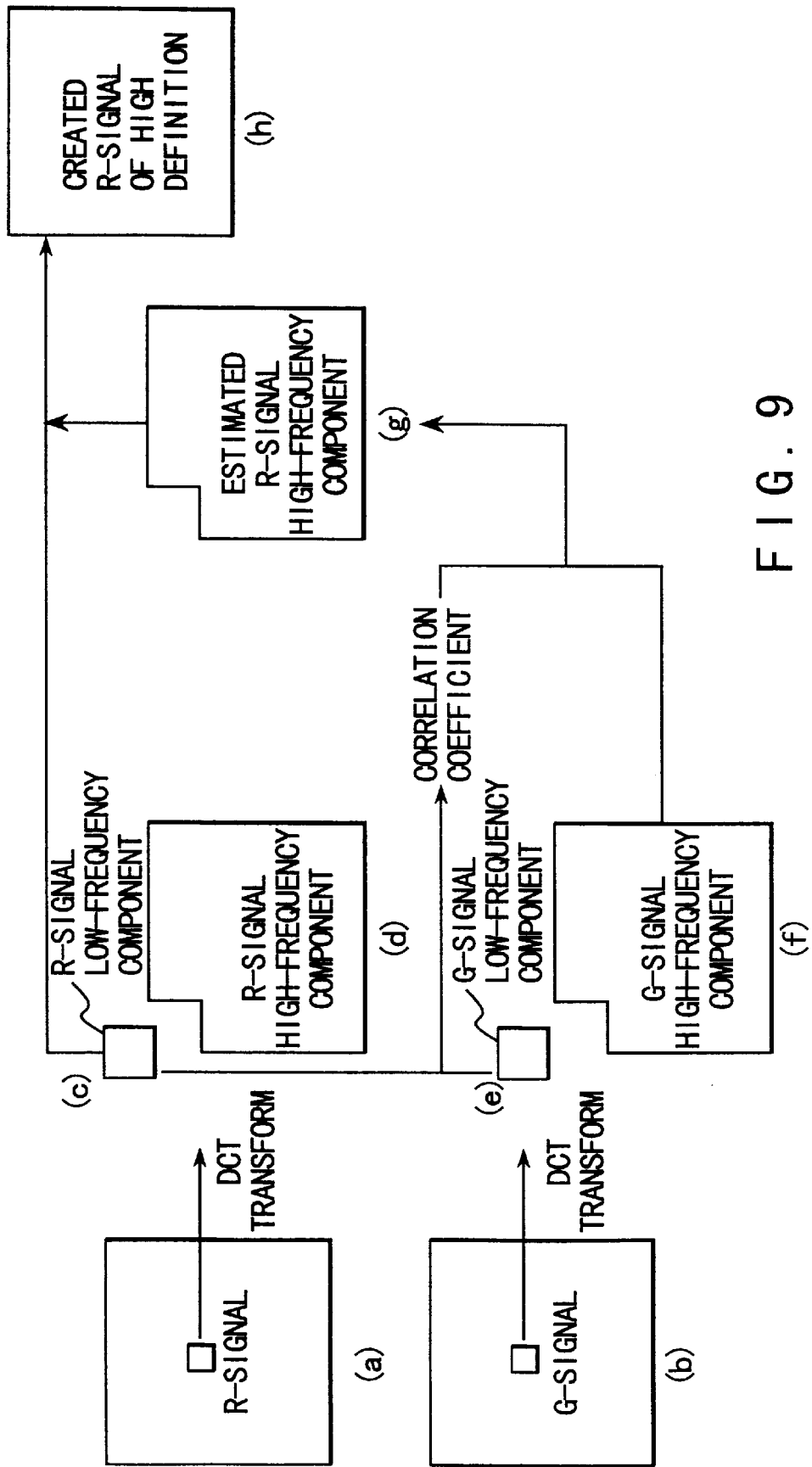
FIG. 9 is a diagram for illustrating the signal processing operation in the second embodiment.

FIG. 9 is a diagram for illustrating the signal processing operation. In FIG. 9, the R-signal and G-signal are shown, but the same processing operation is applied to the B signal and G-signal. In FIG. 9, (a) and (b) indicate an R-signal on the R-signal buffer 502 and a G-signal on the G-signal buffer 503. The signals are divided into regions which have a preset size, 8×8 size in this embodiment and are not overlapped with each other. In FIG. 9, (c), (d), (e), (f) indicate data items obtained by frequency-resolving the regions of the R-signal and B signal on the same coordinate in the DCT transform section 506. In this embodiment, the low-frequency component is arranged on the upper left portion which is the origin and the high-frequency component is arranged on the lower right portion. In FIG. 9, (c), (e) indicate low-frequency components of 2×2 size and (d), (f) indicate the other high-frequency components. The R-signal correlation coefficient calculating section 511 calculates a correlation coefficient expressed by the following equation between the low-frequency components of (c) and (e) of FIG. 9.

$$e^j_{G,R} = \begin{cases} \dfrac{\sigma^j_{G,R}}{\sqrt{\sigma^j_{G,G}\sigma^j_{R,R}}} & \sigma^j_{G,G}\sigma^j_{R,R} \neq 0 \\ 0 & \sigma^j_{G,G}\sigma^j_{R,R} = 0 \end{cases} \quad (11)$$

where $$\sigma^j_{G,R} = \frac{1}{4} \sum_{k=1,4} (G^j(k) - G_d^j)(R^j(k) - R_d^j)$$

In the above equation, j indicates a region and k indicates a coordinate of the low-frequency component. Further, $\sigma^j$ indicates the covariance of a j-th region and $R^j$a, $G^j$a indicate an average value in the j-th region. The correlation coefficient $e^j_{G,R}$ is transferred to the R-signal high-frequency creating section 513 and multiplied by the high-frequency component in the G-signal frequency component buffer 509 to create a high-frequency component of the R-signal as shown in (g) of FIG. 9. The original low-frequency component of the signal on the R-signal buffer 502 and the high-frequency component created in the R-signal high-frequency creating section 513 are subjected to the inverse transform in the inverse DCT transform section 516. In FIG. 9, (h) indicates an R-signal of high definition calculated by repeatedly effecting the above-described process for all of the regions.

As described above, in the second embodiment, an input signal is divided into regions of preset size and frequency-resolved for each region, the low-frequency component of the G-signal having the largest number of pixels is used to derive correlation coefficients with the low-frequency components of the other signals, and high-frequency components of the other signals are created by multiplying the derived correlation coefficients by the high-frequency component of the G-signal. At this time, since the original low-frequency component of the signal is used as it is and only the high-frequency component is adaptively created for each region, the high-frequency component of the color signal can be corrected with high precision, thereby making it possible to derive an output image of high definition with less errors. Further, since the signal processing operation is repeatedly effected for each region, the required memory capacity can be made small and the apparatus can be constructed at low cost.

In the second embodiment, the size of the region is set to 8×8 and the size of the region of the low frequency is set to 2×2, but they are not limitative and can be freely set. For example, it is possible to set the size of the region to 4×4 and set the size of the region of the low frequency to 1×1. If the size of the region of the low frequency is set to 1×1, the covariance in the equation (11) is always set at 0 and the correlation coefficient cannot be calculated, but in this case, the equation (9) in the first embodiment may be used to derive the correlation coefficient. Further, in the second embodiment, the DCT transform section and the inverse DCT transform section are used as one set and are selectively used to process the three signals, but this is not limitative. When it is desired to enhance the processing speed, it is possible to provide individual transform sections for the three signals. As a transform method other than the DCT transform, transformation of frequency resolution (frequency decomposition) such as Fourier transform and Hadamard transform can be used.

Further, in the first embodiment, the correlation coefficient of the R-signal is calculated based on the equation (9), and in the second embodiment, the correlation coefficient of the R-signal is calculated based on the equation (11), but it is possible to derive the correlation coefficient in the second embodiment by use of the equation (9) and derive the correlation coefficient in the first embodiment by use of the equation (11).

A third embodiment of this invention is explained below. FIG. 10 is a diagram showing the construction of the third embodiment. In FIG. 10, an input section 701 such as a TV camera is connected to an input switching section 705 via an R-signal buffer 702, G-signal buffer 703 and B-signal buffer 704. An output of the input switching section 705 is directly connected to an output section 726 and connected to an R-signal frequency component buffer 708, G-signal frequency component buffer 709 and B-signal frequency component buffer 710 via a wavelet transform section 706 and output switching section 707.

Outputs of the R-signal frequency component buffer 708, G-signal frequency component buffer 709 and B-signal frequency component buffer 710 are respectively connected to an R-signal selecting section 711, G-signal selecting section 712 and B-signal selecting section 713. The G-signal selecting section 712 is connected to an R-signal error calculating section 715, B-signal error calculating section 716, R-signal high-frequency creating section 719 and B-signal high-frequency creating section 720 via a coefficient relocating section 714. Further, the R-signal selecting section 711 is connected to the R-signal error calculating section 715 and input switching section 721, and the B-signal selecting section 713 is connected to the B-signal error calculating section 716 and input switching section 721.

Further, the R-signal error calculating section 715 is connected to the input switching section 721 via an R-signal minimum error searching section 717 and R-signal high-frequency creating section 719, and the B-signal error calculating section 716 is connected to the input switching section 721 via an B-signal minimum error searching section 718 and B-signal high-frequency creating section 720. An output of the input switching section 721 is connected to a correction R-signal buffer 724 and correction B-signal buffer 725 via an inverse wavelet transform section 722 and output switching section 723. The correction R-signal buffer 724 and correction B-signal buffer 725 are connected to an output section 726. Further, a controller 727 such as a microcomputer is connected to the input section 701, input switching section 705, output switching section 707, R-signal selecting section 711, G-signal selecting section 712, B-signal selecting section 713, coefficient relocating section 714, R-signal minimum error searching section 717, B-signal minimum error searching section 718, R-signal high-frequency creating section 719, B-signal high-frequency creating section 720, input switching section 721, output switching section 723 and output section 726.

The operation of the above-described construction is explained below. Three signals of RGB from the input section 701 are supplied to the R-signal buffer 702, G-signal buffer 703 and B-signal buffer 704 under the control of the controller 727. Like the second embodiment, in the RGB three signals, the G-signal corresponding to the luminance signal contains a large number of high-frequency components and the R-and B-signals contain a less number of high-frequency components. Signals in the respective buffers are sequentially supplied to the wavelet transform section 706 via the input switching section 705 and subjected to the frequency-resolving process under the control of the controller 727. In the third embodiment, a case wherein the resolving process is effected twice is considered, but the number of processes to be effected can be adjusted by a difference in the high-frequency component between the G-signal and the other signals. The input switching section 706 outputs only the G-signal to the output section 726.

In the wavelet transform section 706, the same transform operation as in the first embodiment is performed and an output signal thereof is sequentially transferred to the R-signal frequency component buffer 708, G-signal frequency component buffer 709 and B-signal frequency component buffer 710 via the output switching section 707 based on the control of the controller 727. The frequency components in the respective buffers are input to the R-signal selecting section 711, G-signal selecting section 712 and B-signal selecting section 713 and, for example, 16 frequency components corresponding to a region of preset size of the original signal, for example, a region of 4×4 size are selected.

The frequency component selected in the R-signal selecting section 711 is supplied to the R-signal error calculating section 715 and input switching section 721, and the frequency component selected in the B-signal selecting section 713 is supplied to the B-signal error calculating section 716 and input switching section 721. Further, the frequency component selected in the G-signal selecting section 712 is subjected to a preset transform operation in the coefficient relocating section 714 and then supplied to the R-signal error calculating section 715, B-signal error calculating section 716, R-signal high-frequency creating section 719 and B-signal high-frequency creating section 720. In the R-signal error calculating section 715, the R-signal frequency component from the R-signal selecting section 711 and a preset number of low-frequency components, for example, three low-frequency components of the G-signal frequency component from the coefficient relocating section 714 are used to derive an error in the similarity for the configuration thereof. In this example, errors in the similarity in all of the regions of the G-signal with respect to one region of the R-signal are calculated in the R-signal error calculating section 715.

The R-signal minimum error searching section 717 searches for a region which gives a minimum error based on an error calculated by the R-signal error calculating section 715 and supplies the degree of similarity as a coefficient to the R-signal high-frequency creating section 719. In the R-signal high-frequency creating section 719, the high frequency component of the G-signal frequency component transferred from the coefficient relocating section 714 is multiplied by the coefficient of the similarity to create the high frequency component of the R-signal. Likewise, a region having a high similarity between the B-signal and the G-signal is searched for in the B-signal error calculating section 716, B-signal minimum error searching section 718 and B-signal high-frequency creating section 720 and the high frequency component of the R-signal is created based on the similarity.

The input switching section 721 selectively transfers the low-frequency component of the R-signal from the R-signal selecting section 711 and the high-frequency component of the R-signal from the R-signal high-frequency creating section 719 to the inverse wavelet transform section 722 under the control of the controller 727. Likewise, the input switching section 721 selectively transfers the low-frequency component of the B signal from the B-signal selecting section 713 and the high-frequency component of the B signal from the B-signal high-frequency creating section 720 to the inverse wavelet transform section 722.

In the inverse wavelet transform section 722, the inverse transform is effected a preset number of times, twice in this embodiment, and the result of the inverse transform is transferred to the correction R-signal buffer 724 or correction B-signal buffer 725 via the output switching section 723. The RGB three signals from the correction R-signal buffer 724, input switching section 705 and correction B-signal buffer 725 are supplied to the output section 726 under the control of the controller 727.

FIG. 11 shows a method for searching for a similar region based on the similarity between the frequency components of the R-signal and the G-signal. FIG. 11A shows a region $r_i$ of 4×4 size of the R-signal and FIG. 11B shows a region $g_j$ of the G-signal similar to the region $r_i$. In this case, i, j indicate the numbers of the regions of the respective signals. FIGS. 11C, 11D show frequency components obtained by subjecting images of FIGS. 11A, 11B to the two-stage wavelet transform. As shown in FIG. 11C, the region $r_i$ is resolved into 16 frequency components of $r_{i,1}$ to $r_{i,16}$. Likewise, as shown in FIG. 11D, the region $g_j$ is resolved into 16 frequency components of $g_{j,1}$ to $g_{j,16}$. When the degree of similarity between $r_i$ and $g_j$ is checked, the low-frequency components thereof are used. In this example, it is assumed that the coefficients of $r_{i,1}$ to $r_{i,4}$ and the coefficients of $g_{j,1}$ to $g_{j,4}$ are compared. In this case, since $r_{i,1}$ and $g_{j,1}$ indicate the bias which is an average density of respective blocks, they are not used. An error Err indicating the similarity between $r_i$ and $g_j$ is defined as follows.

$$Err = \sum_{k=2,4} (s_i g_{j,k} - r_{i,k})^2 \tag{12}$$

where $$s_i = \begin{cases} \dfrac{\sum_{k=2,4} r_{i,k} g_{j,k}}{\sum_{k=2,4} \{g_{j,k}\}^2} & \sum_{k=2,4} \{g_{j,k}\}^2 \neq 0 \\ 0 & \sum_{k=2,4} \{g_{j,k}\}^2 = 0 \end{cases}$$

In the above equation, $s_i$ is a parameter indicating the scale of density. In this example, the regions of the same size are specified between the R-signal and the G-signal for searching for the similar region, but the sizes of the regions may be made different.

FIG. 12 is a diagram for illustrating the relocation of the coefficient in the coefficient relocating section 714. FIG. 12A indicates the arrangement of original expansion coefficients $g_{j,1}$ to $g_{j,16}$ transferred from the G-signal frequency component buffer 709 and arrows indicating the directions thereof. For clarifying the explanation, the expansion coefficients $g_{j,1}$ to $g_{j,16}$ are indicated by alphabets of "a" to "p". Further, the expansion coefficients are classified into $G_1$ and $G_2$ according to the expansion level and classified into $G_{LL}$, $G_{LH}$, $G_{HH}$ and $G_{HL}$ according to filters used.

An output of the subsampler 313 shown in FIG. 3 in the first embodiment gives a high-frequency component $G_{HH}$ in both of the horizontal and vertical directions, an output of the subsampler 314 gives a vertical high-frequency component $G_{HL}$, an output of the subsampler 315 gives a horizontal high-frequency component $G_{LH}$, and an output of the subsampler 316 gives a low-frequency component $G_{LL}$. The expansion coefficients "a" to "p" are assigned such that "a" belongs to $G_{2LL}$, "b" belongs to $G_{2LH}$, "c" belongs to $G_{2HH}$, "d" belongs to $G_{2HL}$, "e", "f", "g", "h" belong to $G_{1LH}$, "i", "j", "k", "l" belong to $G_{1HH}$, and "m", "n", "o", "p" belong to $G_{1HL}$. In the process of searching the similarity of the configuration, a region of the G-signal is not used as it is, but eight patterns including four regions obtained by rotating the original region by 0, 90, 180, 270 degrees and four regions symmetrically transforming the above four regions are used for comparison so that comparison with various types of configurations can be attained.

It is considered to previously form the above eight patterns and subject them to the wavelet transform, but in this case, there occurs a problem from the viewpoint of the amount of calculations and memory capacity. In this example, the effect equivalent to that of the eight patterns is attained by relocation of the expansion coefficients and inversion of the signs. FIG. 12B is an example obtained by rotating FIG. 12A by 90 degrees in the counterclockwise direction. The difference therebetween is that the locations of $G_{2LH}$ and $G_{2HL}$ and the locations of $G_{1LH}$ and $G_{1HL}$ are replaced and the signs of $G_{2HH}$, $G_{2HL}$, $G_{1HH}$ and $G_{1HL}$ are inverted. This can be summarized as follows.

$$G_{mLH} \leftrightarrow -G_{mHL}, -G_{mHH} \quad (13)$$

In the above equation, m indicates the expansion level of the wavelet transform and, in this embodiment, m=1,2. FIGS. 12C to 12H indicate conversion of coefficients obtained by rotation and symmetric transformation. FIG. 12 shows a case of two-stage wavelet transform, but the above regularity applies in the wavelet transform of any desired stage.

An error Err is calculated for each of the eight patterns obtained based on the above regularity in the coefficient relocating section 714 according to the equation (12) in the R-signal error calculating section 715. The G-signal selecting section 712 and coefficient relocating section 714 transfer data relating to all of the regions obtained derived from the G-signal for one region of the R-signal under the control of the controller 727. The R-signal minimum error searching section 717 searches for a region which gives the minimum error based on all of the errors calculated in the R-signal error calculating section 715 and transfers a scale parameter $s_i$ relating to the searched region and a coefficient $p_i$ indicating the eight types of patterns to the R-signal high-frequency creating section 719.

Figure 13:
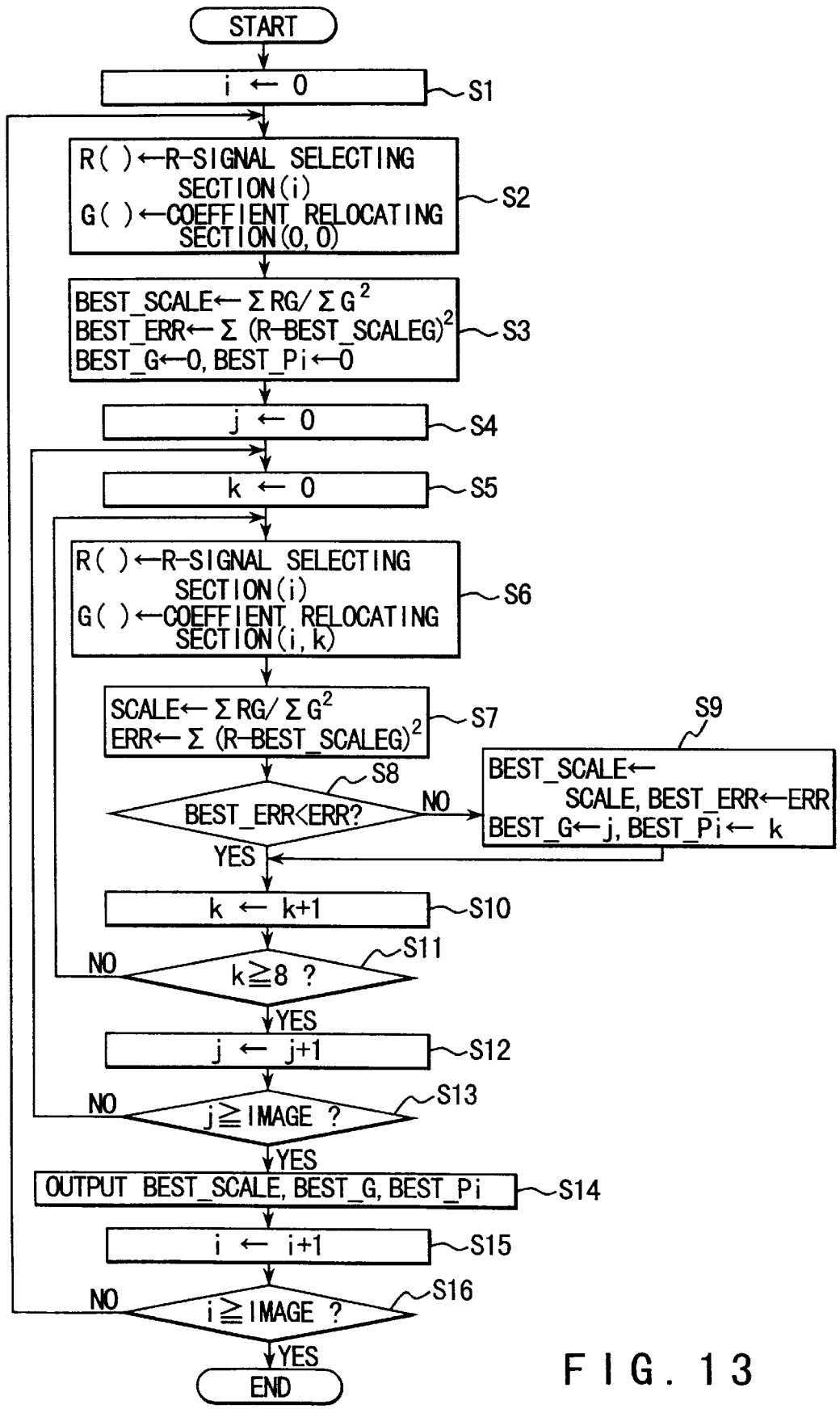
FIG. 13 is a flowchart for illustrating the similar region searching operation.

FIG. 13 is a flowchart for illustrating the similarity searching process. In this case, a variable i indicates the number of a region of the R-signal, j indicates the number of a region of the G-signal, k indicates eight types of rotation patterns relating to the region of the G-signal, R( ) indicates the array in which the frequency components of the region of the R-signal are stored, G( ) indicates the array in which the frequency components of the region of the G-signal are stored, a variable Err indicates an error of the equation (12), and a variable Scale indicates a Scale parameter $s_i$ of the equation (12). Further, the number of regions contained in the R-signal and G-signal is indicated by Image.

First, i is set to 0 in S1.

Next, in S2, the frequency component of the i-th region of the R-signal is substituted into the array R( ), and the frequency component of the 0-th rotation pattern of the 0-th region of the G-signal is substituted into G( ).

In S3, an error and scale parameter are calculated between R( ) and G( ) according to the equation (12), the error is substituted into a variable Best_Err and the scale parameter is substituted into a variable Best_Scale.

At this time, 0 is substituted into a variable Best_G and a variable Best_Pi. In S4, S5, j, k are set to 0.

In S6, the frequency component of an i-th region of the R-signal is substituted into the array R( ), and the frequency component of the k-th rotation pattern of the j-th region of the G-signal is substituted into G( ).

In S7, an error and scale parameter are calculated between R( ) and G( ) according to the equation (12), and the error and the scale parameter are substituted into Err and Scale.

In S8, Err and Best_Err are compared with each other, and the step S9 is effected when Best-Err is larger and the step S10 is effected when Best_Err is smaller.

In S9, Scale is substituted into Best_Scale, Err is substituted into Best_Err, j is substituted into Best_G, and k is substituted into Best_Pi.

In S10 to S13, "1" is added to j, k, and the above process is repeatedly effected until k exceeds 8 and j exceeds Image.

In S14, Best_Scale, Best_G, Best_Pi are output.

In S15, S16, "1" is added to i, and the above process is repeatedly effected until i exceeds Image.

Based on the above process, a region included in all of the regions derived from the G-signal and having the highest similarity to one region of the R-signal can be obtained.

Figure 14:
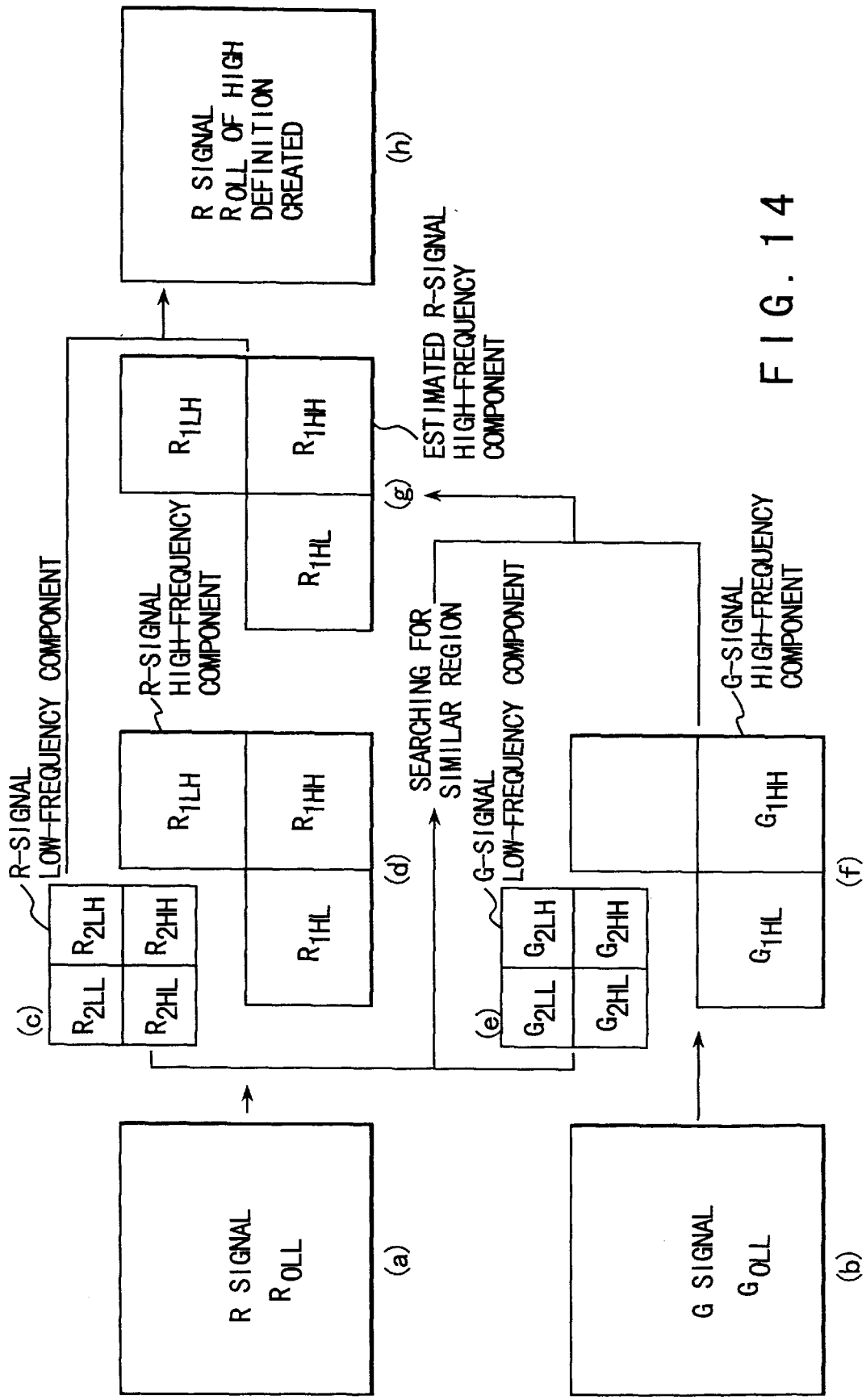
FIG. 14 is a diagram for illustrating the signal processing operation in the third embodiment.

FIG. 14 is a diagram showing the above signal processing operation. In FIG. 14, the signal processing only relating to the R-signal and G-signal is shown, but the signal processing relating to the B-signal and G-signal is substantially the same. In FIG. 14, (a) and (b) indicate an R-signal $R_{0LL}$ in the R-signal buffer 702 and a G-signal $G_{0LL}$ in the G-signal buffer 703. The above signals are divided into regions which have a preset size, 4×4 size in this embodiment, and are not overlapped with each other. In FIG. 14, (c), (d), (e), (f) indicate $R_{2LL}$, $R_{2HH}$, $R_{2LH}$, $R_{1HH}$, $R_{1HL}$, $R_{1LH}$ in the R-signal frequency component buffer 708 which are frequency-resolved in the wavelet transform section 706 and $G_{2LL}$, $G_{2HH}$, $G_{2LH}$, $G_{1HH}$, $G_{1HL}$, $G_{1LH}$ in the G-signal frequency component buffer 709. The R-signal error calculating section 715 and R-signal minimum error searching section 717 calculate the scale parameter $s_i$ and the coefficient $p_i$ indicating eight types of patterns between $R_{2HH}$, $R_{2HL}$, $R_{2LH}$ of (c) in FIG. 14 and $G_{2HH}$, $G_{2HL}$, $G_{2LH}$ of (e) in FIG. 14. The coefficient is supplied to the R-signal high-frequency creating section 719, the relocation of the coefficient shown in FIG. 12 is performed for $G_{1HH}$, $G_{1HL}$, $G_{1LH}$ based on the coefficient $p_i$, and then $G_{1HH}$, $G_{1HL}$, $G_{1LH}$ are multiplied by the scale parameter $s_i$. Components of the respective regions shown in FIGS. 11C and 11D are subjected to the process expressed by the following equation.

$$r_{i,k} = S_i g_{j,k} \qquad (14)$$

In the above equation, k is a coefficient shown in FIGS. 11C, 11D and k=5 to 16. In FIG. 14, (g) indicates created high-frequency components $R_{1HH}$, $R_{1HL}$, $R_{1LH}$ of the R-signal. In FIG. 14, (h) indicates an R-signal $R_{0LL}$ of high definition calculated by subjecting the created high-frequency components $R_{1HH}$, $R_{1HL}$, $R_{1LH}$ and $R_{2LL}$, $R_{2HH}$, $R_{2HL}$, $R_{2LH}$ in the R-signal frequency component buffer 708 to the inverse wavelet transform in the inverse wavelet transform section 722.

As described above, in the third embodiment, an input signal is divided into regions of preset size so as to be frequency-resolved, a region in which the low-frequency component of a signal other than the G-signal containing a largest number of pixels is similar in configuration to the low-frequency component of the G-signal is derived, and the high-frequency component of the other signal is created based on the high-frequency component of the G-signal in the derived region. At this time, since the original low-frequency component of the signal is used as it is and only the high-frequency component thereof is adaptively created for each region, the high-frequency component of the color signal can be corrected with high precision and an output image of high definition with less error can be obtained. Further, since the high-frequency component is derived based on the similarity in configuration, the high-frequency component can be derived even in a case where the continuity of the signal is degraded in the edge portion or the like or the degree of correlation with the G-signal is low, and thus a preferable output image can be obtained for various types of images.

In the third embodiment, the size of the region is set to 4×4, but this is not limitative and can be freely set. Further, in the third embodiment, the wavelet transform section and the inverse wavelet transform section are used as one set and are selectively used to process the three signals, but this is not limitative. When it is desired to enhance the processing speed, it is possible to provide individual transform sections for the three signals.

Next, a fourth embodiment of this invention is explained. FIG. 15 is a diagram showing the construction of the fourth embodiment. The construction is basically the same as that of the first embodiment, but in the fourth embodiment, the construction of the stage which follows the G-signal high-frequency buffer 107 in the first embodiment is modified by adding a high frequency emphasizing section 801, G-signal inverse wavelet transform section 802 and error calculating section 803.

An output of the G-signal high-frequency buffer 107 is connected to the R-signal high-frequency creating section 110, B-signal high-frequency creating section 111 and G-signal inverse wavelet transform section 802 via the high frequency emphasizing section 801. The G-signal inverse wavelet transform section 802 receives inputs from the high frequency emphasizing section 801 and G-signal low-frequency buffer 106 and is connected to the output section 114 and error calculating section 803. The error calculating section 803 is connected to the high frequency emphasizing section 801 and the controller 115 is connected to the R-signal correlation coefficient calculating section 108, R-signal high-frequency creating section 110, B-signal correlation coefficient calculating section 109, B-signal high-frequency creating section 111, high frequency emphasizing section 801 and error calculating section 803.

Next, the operation of the above construction is explained. Three signals of RGB from the input section 101 are supplied to the R-signal buffer 102, B-signal buffer 103 and G-signal buffer 104 under the control of the controller 115. A G-signal in the G-signal buffer 104 is supplied to the wavelet transform section 105 and subjected to the wavelet transformation. A low-frequency component after the wavelet transformation is supplied to the G-signal low-frequency buffer 106 and a high-frequency component is supplied to the G-signal high-frequency buffer 107. The high-frequency component in the G-signal high-frequency buffer 107 is transferred to the high frequency emphasizing section 801 and multiplied by a preset coefficient α.

Figure 16A:
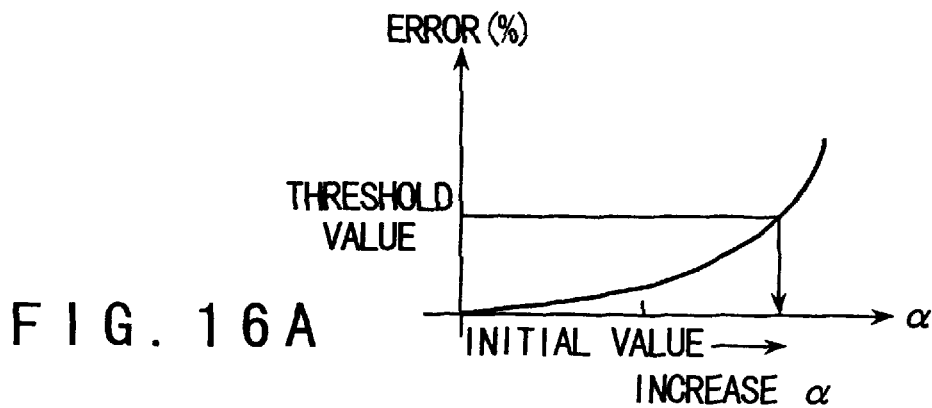
FIGS. 16A and 16B are diagrams for illustrating a method for determining the coefficient α.
Figure 16B:
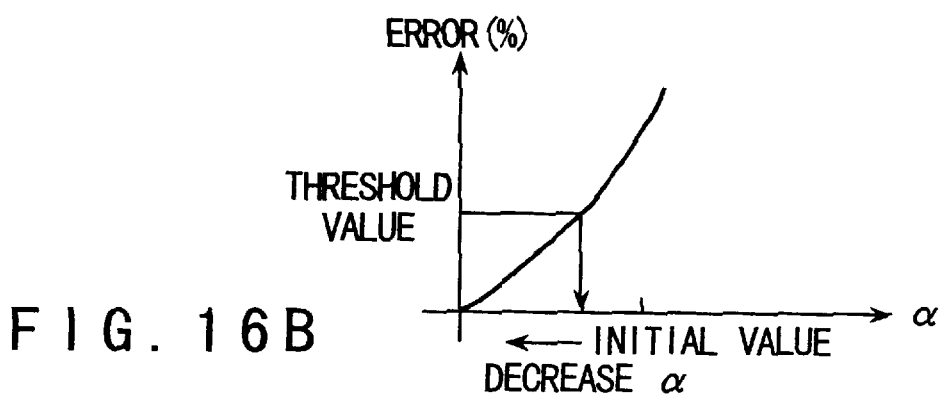

FIGS. 16A and 16B are diagrams for illustrating a method for determining the coefficient α in the high frequency emphasizing section 801. An initial value of the coefficient α is set to 1.5, for example. A G-signal is re-constructed in the G-signal inverse wavelet transform section 802 based on the high frequency component of the G-signal subjected to the emphasizing process and the low-frequency component from the G-signal low-frequency buffer 106. The density range of the re-constructed G-signal is checked in the error calculating section 803, and the rate of the number of pixels which is set outside a preset range, for example, a range of 0 to 255 in the case of 8-bit density level, is checked. As shown in FIG. 16A, if the rate does not exceed a preset threshold value, for example, 1%, the high frequency emphasizing section 801 increases the coefficient α and then effects the emphasizing process again. If the rate exceeds the preset threshold value as shown in FIG. 16B, the high frequency emphasizing section 801 decreases the coefficient α and then effects the emphasizing process again. When the rate of error changes from a smaller value to a larger value than the threshold value or changes from a larger value to a smaller value than the threshold value, the emphasizing process is completed.

After the process for the high-frequency component of the G-signal is completed, the R-signal correlation coefficient calculating section 108 calculates a color correlation coefficient between the R-signal in the R-signal buffer 102 and the low-frequency component of the G-signal in the G-signal low-frequency buffer 106. Likewise, the B-signal correlation coefficient calculating section 109 calculates a color correlation coefficient between the B signal in the B-signal buffer 103 and the low-frequency component of the G-signal in the G-signal low-frequency buffer 106. The above color correlation coefficients are supplied to the R-signal high-frequency creating section 110 and B-signal high-frequency creating section 111 and multiplied by the high-frequency component of the G-signal subjected to the emphasizing process in the high frequency emphasizing section 801 so as to create the high-frequency components of the R-signal and B-signal.

The R-signal inverse wavelet transform section 112 performs the inverse wavelet transform based on the R-signal (low-frequency component) in the R-signal buffer 102 and the high-frequency component of the R-signal created in the R-signal high-frequency creating section 110 and supplies the R-signal of high definition to the output section 114. Likewise, the B-signal inverse wavelet transform section 113 performs the inverse wavelet transform based on the B-signal (low-frequency component) in the B-signal buffer 103 and the high-frequency component of the B-signal created in the B-signal high-frequency creating section 111 and supplies the B-signal of high definition to the output section 114. Further, the G-signal of the G-signal inverse wavelet transform section 802 is also supplied to the output section 114 and thus three signals of RGB are output from the output section 114.

As described above, in the fourth embodiment, the G-signal having the largest number of pixels among an input signal is divided into low- and high-frequency components by the wavelet transform and the high-frequency component is subjected to the emphasizing process. Then, correlation coefficients with the other signals are derived by use of the low-frequency component thereof, and the high-frequency components of the other signals are derived by multiplying the derived correlation coefficients by the high-frequency component of the G-signal subjected to the emphasizing process. At this time, since the original low-frequency component of the signal is used as it is and the high-frequency component is adaptively created for each pixel unit, the high-frequency component of the color signal can be corrected with high precision, thereby making it possible to derive an output image of high definition with less errors. Further, since the high-frequency component is subjected to the emphasizing process with the error rate kept less than a preset threshold value, it becomes possible to derive an output signal of high visual quality with enhanced contrast.

In the fourth embodiment, the coefficient $\alpha$ used for the emphasizing process is automatically adjusted to prevent the error rate from exceeding the preset threshold value, but this is not limitative. The coefficient $\alpha$ can be manually derived, and in this case, the error calculating section 803 can be omitted.

Next, a fifth embodiment of this invention is explained. FIG. 17 is a diagram showing the construction of the fifth embodiment. The construction of the fifth embodiment is basically the same as that of the first embodiment, but in the fifth embodiment, an R-signal low-frequency emphasizing section 901, B-signal low-frequency emphasizing section 902, G-signal low-frequency emphasizing section 903, G-signal high-frequency emphasizing section 904, G-signal inverse wavelet transform section 905 and error calculating section 906 are added to the construction of the first embodiment. The R-signal low-frequency emphasizing section 901 connected to the output of the R-signal buffer 102 is connected to the R-signal inverse wavelet transform section 112. The B-signal low-frequency emphasizing section 902 connected to the output of the B-signal buffer 103 is connected to the B-signal inverse wavelet transform section 113. The G-signal low-frequency emphasizing section 903 connected to the output of the G-signal low-frequency buffer 106 is connected to the G-signal inverse wavelet transform section 905. The G-signal high-frequency buffer 107 is connected to the R-signal high-frequency creating section 110, B-signal high-frequency creating section 111 and G-signal inverse wavelet transform section 905 via the G-signal high-frequency emphasizing section 904. The G-signal inverse wavelet transform section 905 is connected to the outputs of the G-signal high-frequency emphasizing section 904 and G-signal low-frequency emphasizing section 903 and connected to the output section 114 and error calculating section 906. The error calculating section 906 is connected to the G-signal high-frequency emphasizing section 904 and the controller 115 is connected to the R-signal correlation coefficient calculating section 108, R-signal high-frequency creating section 110, R-signal low-frequency emphasizing section 901, B-signal correlation coefficient calculating section 109, B-signal high-frequency creating section 111, B-signal low-frequency emphasizng section 902, G-signal low-frequency emphasizing section 903, G-signal high-frequency emphasizing section 904 and error calculating section 906.

The operation of the above construction is explained below. Three signals of RGB from the input section 101 are supplied to the R-signal buffer 102, B-signal buffer 103 and G-signal buffer 104 under the control of the controller 115.

A G-signal in the G-signal buffer 104 is subjected to the wavelet transformation by the wavelet transform section 105. A low-frequency component after the wavelet transformation is supplied to the G-signal low-frequency buffer 106 and a high-frequency component is supplied to the G-signal high-frequency buffer 107. The low-frequency component $G_{1LL}$ of the G-signal low-frequency buffer 106 is normalized by the maximum value $M_{max}$ of density based on the following equation in the G-signal low-frequency emphasizing section 903 and then raised to the $\beta$-th power by use of a coefficient $\beta$. In the fifth embodiment, since it is assumed that an 8-bit density range is used, $M_{max}$ is equal to 255.

$$G'_{1LL} = M_{max} \left( \frac{G_{1LL}}{M_{max}} \right)^{\beta} \quad (16)$$

The coefficient $\beta$ expands the range of a dark portion when $\beta<1$ and expands the range of a bright portion when $\beta>1$. Therefore, the G-signal low-frequency emphasizing section 903 determines the bright portion or dark portion based on the average density value of the low-frequency components of the G-signal and sets the initial value of the coefficient $\beta$. As one example, since a range of 0 to 255 is set in the case of 8-bit density level, a portion whose average density value of the low-frequency components is 128 or less is determined as a dark portion and a portion whose average density value is larger than 128 is determined as a bright portion. The initial value of the coefficient $\beta$ is set to 0.5 in the dark portion and 1.5 in the bright portion. As the coefficient $\beta$, the same value is used for all of the low-frequency components.

The low-frequency component subjected to the emphasizing process and the normal high-frequency component are supplied to the G-signal inverse wavelet transform section 905 under the control of the controller 115 and G-signal is re-constructed. In the error calculating section 906, the density range of the re-constructed G-signal is checked and the rate of the number of pixels which is set outside a preset range is checked. Like the fourth embodiment, an optimum coefficient $\beta$ can be thus obtained. The coefficient $\beta$ is supplied to the R-signal low-frequency emphasizing section 901 and B-signal low-frequency emphasizing section 902 via the controller 115 and the range of the low-frequency component is expanded as in the case of equation (16).

Next, the controller 115 triggers the G-signal high-frequency emphasizing section 904. In the G-signal high-frequency emphasizing section 904 as shown in FIG. 11D, the high-frequency components $G_{1HH}$, $G_{1HL}$, $G_{1LH}$ of the G-signal are divided into regions of 4×4, for example, and the components $g_{j,5}$ to $g_{j,16}$ thereof are extracted. Then, a coefficient $\gamma_j$ used for emphasis is calculated for each region according to the following equation.

$$\gamma_j \leq \frac{M_{max} - M_{max} \left( \frac{g_j^a}{M_{max}} \right)^{\beta}}{g_{j,k} - g_j^a} \quad (17)$$

In the above equation, j indicates the number of a region of the high-frequency component, k indicates a factor of 5 to 16, and $g_j^a$ indicates the average density of a j-th region. The equation (17) indicates a condition that the density range of each region does not depart from a preset range for a given coefficient $\beta$. The high-frequency component of the G-signal high-frequency buffer 107 is multiplied by the coefficient $\gamma$ in the high frequency emphasizing section 904.

After this, the R-signal correlation coefficient calculating section 108 calculates a color correlation coefficient between the R-signal in the R-signal buffer 102 and the low-frequency component of the G-signal in the G-signal low-frequency buffer 106. Likewise, the B-signal correlation coefficient calculating section 109 calculates a color correlation coefficient between the B signal in the B-signal buffer 103 and the low-frequency component of the G-signal in the G-signal low-frequency buffer 106. The above color correlation coefficients are supplied to the R-signal high-frequency creating section 110 and B-signal high-frequency creating section 111 and multiplied by the high-frequency component of the emphasized G-signal in the G-signal high-frequency emphasizing section 904 so as to create the high-frequency components of the R-signal and B signal. The R-signal inverse wavelet transform section 112 performs the inverse wavelet transform based on the emphasized low-frequency component in the R-signal low-frequency emphasizing section 901 and the high-frequency component of the R-signal created in the R-signal high-frequency creating section 110 and supplies an R-signal of high definition to the output section 114. Likewise, the B-signal inverse wavelet transform section 113 performs the inverse wavelet transform based on the emphasized low-frequency component in the B-signal low-frequency emphasizing section 902 and the high-frequency component of the B signal created in the B-signal high-frequency creating section 111 and supplies a B-signal of high definition to the output section 114. Further, the G-signal in the G-signal inverse wavelet transform section 905 is also supplied to the output section 114 and thus the RGB three signals are output from the output section 114.

As described above, in the fifth embodiment, the G-signal having the largest number of pixels among an input signal is divided into high- and low-frequency components by the wavelet transform and the high- and low-frequency components are subjected to the emphasizing process. Then, correlation coefficients between the original low-frequency component of the G-signal and the other signals are derived and the high-frequency components of the other signals are derived by multiplying the derived correlation coefficients by the high-frequency component of the G-signal subjected to the emphasizing process. The same emphasizing process as that for the low-frequency component of the G-signal is effected for the other signals. Since the high- and low-frequency components are subjected to the optimum emphasizing process and then the high-frequency component is adaptively created for each region, an output signal with expanded dynamic range and enhanced contrast can be obtained. Further, since parameters are controlled by previously checking occurrence of error caused by the expanding process, and at the same time, parameters for the emphasizing process are controlled, unnatural emphasis will not tend to occur.

In the fifth embodiment, the coefficient β used for the emphasizing process is automatically adjusted so that the rate of error will not exceed a threshold value, but this is not limitative. It is possible to manually determine the coefficient β, and in this case, the error calculating section 906 can be omitted.

The above-described embodiments include the following constructions 1 to 9 of this invention.

1. A signal processing apparatus for processing a signal in which the information amount of a signal related to at least one of a plurality of spectral sensitivity characteristics is larger than the information amount of any one of signals related to the other spectral sensitivity characteristics, comprising:

frequency resolving means for resolving the signal of the spectral sensitivity characteristic having a large information amount into high- and low-frequency components;

correlation coefficient calculating means for calculating correlation coefficients between the low-frequency component derived from the frequency resolving means and the signals of the spectral sensitivity characteristics having a small information amount;

high-frequency creating means for creating high-frequency components of the signals of the spectral sensitivity characteristics having a small information amount based on the correlation coefficients derived from the correlation coefficient calculating means and the high-frequency component derived from the frequency resolving means; and frequency synthesizing means for synthesizing the high-frequency component derived from the high-frequency creating means and the signal of the spectral sensitivity characteristic having a small information amount to output an output signal with high definition.

2. A signal processing apparatus described in the item 1, wherein the signal of the spectral sensitivity characteristic having a large information amount corresponds to a luminance signal and a signal other than the above signal having a large information amount corresponds to a color signal.

3. A signal processing apparatus described in the item 1, wherein the frequency resolving means and frequency synthesizing means use the Harr function or Daubechies function as the basic function to perform the orthogonal wavelet transform or bi-orthogonal wavelet transform.

4. A signal processing apparatus described in the item 1, wherein the correlation coefficient calculating means calculates a correlation coefficient based on the color correlation between signals of a plurality of spectral sensitivity characteristics.

5. A signal processing apparatus described in the item 1, wherein the frequency resolving means and frequency synthesizing means use the orthogonal transform corresponding to one of the DCT transform, Fourier transform and Hadamard transformation for each region of preset size.

6. A signal processing apparatus for processing a signal in which the information amount of a signal related to at least one of a plurality of spectral sensitivity characteristics is larger than the information amount of any one of signals related to the other spectral sensitivity characteristics, comprising:

frequency resolving means for resolving a signal into a plurality of frequency components by using a function of local distribution as a basic function;

extraction means for extracting a frequency component corresponding to a first preset region of the signal of the spectral sensitivity-characteristic having a large information amount and a frequency component corresponding to a second preset region of the signal of the other spectral sensitivity characteristic having a small information amount from the coefficients of the plurality of frequency components derived from the frequency resolving means;

similarity calculating means for calculating the degree of similarity between the frequency components of the first and second preset regions derived from the extraction means;

searching means for searching for the first preset region having the highest degree of similarity with respect to the second preset region based on the degree of similarity derived from the similarity calculating means;

high-frequency creation means for creating a high-frequency component of the second preset region based on the degree of similarity according to the high-frequency component related to the first preset region derived from the searching means; and frequency synthesizing means for synthesizing the high-frequency component derived from the high-frequency creating means and the signal of the spectral sensitivity characteristic having a small information amount to output an output signal with high definition.

7. A signal processing apparatus described in the item 6, wherein the frequency resolving means and frequency synthesizing means use the Harr function or Daubechies function as the basic function to perform the orthogonal wavelet transform or bi-orthogonal wavelet transform.

8. A signal processing apparatus for processing a signal in which the information amount of a signal related to at least one of a plurality of spectral sensitivity characteristics is larger than the information amount of any one of signals related to the other spectral sensitivity characteristics, comprising:

frequency resolving means for resolving the signal of the spectral sensitivity characteristic having a large information amount into high- and low-frequency components;

high-frequency emphasizing means for multiplying a coefficient α larger than 1 by the high-frequency component resolved by the frequency resolving means;

error calculating means for calculating the rate at which a signal obtained by synthesizing the high-frequency component emphasized by the high-frequency emphasizing means and the low-frequency component is set outside a preset range; and control means for controlling the value of the coefficient α based on the result of calculation by the error calculating means.

9. A signal processing apparatus for processing a signal in which the information amount of a signal related to at least one of a plurality of spectral sensitivity characteristics is larger than the information amount of any one of signals related to the other spectral sensitivity characteristics, comprising:

frequency resolving means for resolving the signal of the spectral sensitivity characteristic having a large information amount into high- and low-frequency components;

reference signal low-frequency emphasizing means for emphasizing the low-frequency component resolved by the frequency resolving means by raising the normalized signal thereof to the β-th power by use of a coefficient β;

error calculating means for synthesizing the low-frequency component emphasized by the reference signal low-frequency emphasizing means and the high-frequency component and calculating the rate at which the synthesized signal is set outside a preset range;

control means for controlling the coefficient β based on the result of calculation by the error calculating means;

reference signal high-frequency emphasizing means for dividing the high-frequency component resolved by the frequency resolving means into preset regions and multiplying the divided high-frequency component of each region by a coefficient γ derived from the coefficient β used in the reference signal low-frequency emphasizing means according to a preset relational expression; and dependent signal low-frequency emphasizing means for emphasizing the signal of the spectral sensitivity characteristic having a small information amount by raising the normalized signal thereof to the β-th power.

The embodiments, operations and effects corresponding to the constructions 1 to 9 of this invention are as follows.

(Constructions 1 to 4)
(Corresponding Embodiments)

The embodiments of this invention correspond to the first embodiment described before. The frequency resolving means in the above construction corresponds to the wavelet transform section 105 shown in FIGS. 1 and 3. The basic function of the wavelet transform corresponds to the Harr function shown in FIG. 4, but it includes an orthogonal wavelet function such as a Daubechies function or bi-orthogonal wavelet function. The correlation coefficient calculating means in the above construction corresponds to the R-signal correlation coefficient calculating section 108 and B-signal correlation coefficient calculating section 109 in FIG. 1. The correlation coefficient calculating means also has a function of calculating a correlation coefficient based on the color correlation between output signals of a plurality of spectral sensitivity characteristics. The high-frequency creating means in the above construction corresponds to the R-signal high-frequency creating section 110 and B-signal high-frequency creating section 111 of FIG. 1. The frequency synthesizing means in the above construction corresponds to the R-signal inverse wavelet transform section 112 and B-signal inverse wavelet transform section 113 shown in FIGS. 1 and 6.

A preferable example of the signal processing apparatus according to this invention is as follows. An image signal from the input section. 101 is stored in the R-signal buffer 102, B-signal buffer 103 and G-signal buffer 104, and the G-signal having the largest number of pixels and stored in the G-signal buffer 104 is transferred to the wavelet transform section 105 and is frequency-resolved into high- and low-frequency components. Then, correlation coefficients between the low-frequency component and the R-signal and B signal are respectively calculated by the R-signal correlation coefficient calculating section 108 and B-signal correlation coefficient calculating section 109 and the high-frequency components of the R-signal and B signal are created by multiplying the calculated correlation coefficients by the high-frequency component of the G-signal in the R-signal high-frequency creating section 110 and B-signal high-frequency creating section 111. The thus created high-frequency components and the original R-signal and B-signal are synthesized in the R-signal inverse wavelet transform section 112 and B-signal inverse wavelet transform section 113.

(Operation)

A signal related to the spectral sensitivity characteristic having a large information amount (in this example, a G-signal having the largest number of pixels) among an input signal is subjected to the frequency-resolving process such as the wavelet transform to be resolved into high- and low-frequency components. The thus obtained low-frequency component is used to derive correlation coefficients with signals of other spectral sensitivity characteristics having a less information amount (in this example, R- and B-signals) and the correlation coefficients are multiplied by the high-frequency component of the G-signal to create the high-frequency components of the R- and B-signals as the other signals.

(Effect)

Since the original low-frequency component of the signal is used as it is and the high-frequency component is adaptively created for each pixel unit and added, the high-frequency component of the color signal can be corrected with high precision and an output image of high definition with less error can be obtained. Further, in a case where wavelet transform means is used as the frequency-resolving means, information of neighboring pixels can be commonly used so that the satisfactory continuity can be obtained even if the high-frequency component is controlled for each pixel unit and a reproduced image of high quality can be obtained. Further, since the frequency information and position information can be simultaneously obtained, the high-frequency component can be adaptively created by calculating a correlation coefficient for each pixel unit.

(Construction 5)
(Corresponding Embodiment)

The embodiment of this invention corresponds to the second embodiment described before. The frequency resolving means in the above construction corresponds to the input switching section 505, DCT transform section 506 and output switching section 507 shown in FIG. 7. The frequency synthesizing means in the above construction corresponds to the input switching section 515, inverse DCT transform section 516 and output switching section 517.

A preferable example of the signal processing apparatus according to this invention is as follows. An image signal from the input section 501 shown in FIG. 7 is stored in the R-signal buffer 502, G-signal buffer 503 and B-signal buffer 504 and is then frequency-resolved into high- and low-frequency components for each region of preset size in the DCT transform section 506. Then, correlation coefficients between the low-frequency component of the G-signal having the largest number of pixels and the low-frequency components of the R-signal and B signal are respectively calculated by the R-signal correlation coefficient calculating section 511 and B-signal correlation coefficient calculating section 512 and the high-frequency components of the R-signal and B signal are created by multiplying the calculated correlation coefficients by the high-frequency component of the G-signal in the R-signal high-frequency creating section 513 and B-signal high-frequency creating section 514. The thus created high-frequency components and the original low-frequency components of the R-signal and B-signal are synthesized in the inverse DCT transform section 516.

(Operation)

An input signal is subjected to the DCT transform, for example, for each region of preset size so as to be resolved into high- and low-frequency components. The thus obtained low-frequency component is used to derive correlation coefficients between the G-signal having the largest number of pixels and the R- and B-signals as the other signals and the thus derived correlation coefficients are multiplied by the high-frequency component of the G-signal to create the high-frequency components of the R-and B signals.

(Effect)

Since the frequency-resolving process and synthesizing process are effected for each region of small size, the apparatus construction in which necessary memory capacity is reduced can be attained. Further, since the original low-frequency component of the signal is used as it is and the high-frequency component is adaptively created for each pixel unit and added, the high-frequency component of the color signal can be corrected with high precision and an output image of high definition with less error can be obtained.

(Constructions 6 and 7)
(Corresponding Embodiments)

The embodiment of this invention corresponds to the third embodiment described before. The frequency resolving means in the above construction corresponds to the wavelet transform section 706 shown in FIG. 10. As the basic function of the wavelet transform, the Harr function shown in FIG. 4 can be used, but an orthogonal wavelet function such as the Daubechies function and a bi-orthogonal wavelet function can also be used. The extracting means in the above construction corresponds to the R-signal selecting section 711, G-signal selecting section 712, and B-signal selecting section 713 of FIG. 10. The similarity calculating means in the above construction corresponds to the R-signal error calculating section 715 and B-signal error calculating section 716 of FIG. 10. The searching means in the above construction corresponds to the R-signal minimum error searching section 717 and B-signal minimum error searching section 718 of FIG. 10. The high-frequency creating means in the above construction corresponds to the R-signal high-frequency creating section 719 and B-signal high-frequency creating section 720 of FIG. 10. The frequency synthesizing means in the above construction corresponds to the inverse wavelet transform section 722 of FIG. 10.

A preferable example of the signal processing apparatus according to this invention is as follows. An image signal from the input section 701 shown in FIG. 10 is stored in the R-signal buffer 702, G-signal buffer 703 and B-signal buffer 704 and the signals in the respective buffers are transferred to the wavelet transform section 706 and then frequency-resolved into high- and low-frequency components. Next, the degrees of similarity in configuration between the low-frequency component of the G-signal having the largest number of pixels and the low-frequency components of the R-signal and B signal are respectively calculated for each region of preset size by the R-signal error calculating section 715 and B-signal error calculating section 716, and a region having the highest similarity is derived by the R-signal minimum error searching section 717 and B-signal minimum error searching section 718. Next, the high-frequency component of the G-signal corresponding to the thus derived region is corrected according to the degree of similarity by the R-signal high-frequency creating section 719 and B-signal high-frequency creating section 720 and the corrected high-frequency component and the original low-frequency components of the R-signal and B signal are synthesized in the inverse wavelet transform section 722.

(Operation)

An input signal is resolved into a plurality of frequency components by effecting the frequency-resolving process, for example, wavelet transform using a function with local distribution as the basic function. Next, a region of similarity in configuration between the low-frequency component of a signal of the spectral sensitivity characteristic having a large information amount (in this example, a G-signal having the largest number of pixels) among an input signal and the low-frequency components of signals of other spectral sensitivity characteristics having a less information amount (in this example, R- and B-signals) is searched for and the high-frequency component of the G-signal in this region is corrected according to the degree of similarity so as to create the high-frequency components of the R- and B-signals.

(Effect)

Since the high-frequency component is created based on the similarity in configuration, the high-frequency component can be obtained even when the continuity of the signal at the edge portion or the like is degraded or the correlation with the G-signal is low, and a satisfactory output image for variety of images can be obtained.

(Construction 8)
(Corresponding Embodiment)

The embodiment of this invention corresponds to the fourth embodiment described before. The high-frequency emphasizing means in the above construction corresponds to the high-frequency emphasizing section 801 shown in FIG. 15. The error calculating means in the above construction corresponds to the G-signal inverse wavelet transform section 802 and error calculating section 803 shown in FIG. 15. The control means in the above construction corresponds to the controller 115 shown in FIG. 15.

A preferable example of the signal processing apparatus according to this invention is as follows. A G-signal in the G-signal buffer 104 shown n FIG. 15 is supplied to the wavelet transform section 105 and frequency-resolved into high- and low-frequency components and the high-frequency component is multiplied by a coefficient $\alpha$ for emphasis in the high-frequency emphasizing section 801. Next, the emphasized high-frequency component and the low-frequency component are re-constructed by the G-signal inverse wavelet transform section 802 and the rate at which the re-constructed image is set outside a specified density range is calculated in the error calculating section 803. Then, the coefficient $\beta$ is controlled by the controller 115 so that the error will not exceed a preset threshold value, the emphasized high-frequency component is used to create the emphasized high-frequency components of the R-signal and B-signal, and three signals of R, G, B are re-constructed based on the emphasized high-frequency components and the low-frequency components.

(Operation)

A signal of the spectral sensitivity characteristic having a large information amount (in this example, a G-signal having the largest number of pixels) among an input signal is resolved into high- and low-frequency components by the frequency-resolving means, for example, wavelet transform or DCT transform section. The high-frequency component is multiplied by a coefficient $\alpha$ and emphasized, the emphasized high-frequency component is used to re-construct an original signal and the coefficient $\alpha$ is controlled according to the magnitude of error. After this, correlation coefficients between the low-frequency component of the G-signal and the low-frequency components of signals of other spectral sensitivity characteristics having a less information amount (in this example, R- and B-signals) are derived and multiplied by the emphasized high-frequency component of the G-signal so as to create the emphasized high-frequency components of the R- and B-signals.

(Effect)

An output signal of high visual quality with enhanced contrast can be obtained. Since occurrence of error caused by the emphasizing process is previously checked, unnatural emphasis will not tend to occur. Further, when the wavelet transform is used as the frequency-resolving means, information of neighboring pixels can be commonly used so that a reproduced image which is excellent in the continuity and high in the image quality can be obtained. When the DCT transform is used as the frequency-resolving means, the memory capacity can be reduced.

(Construction 9)
(Corresponding Embodiment)

The embodiment of this invention corresponds to the fifth embodiment described before. The reference signal low-frequency emphasizing means in the above construction corresponds to the G-signal low-frequency emphasizing section 903 shown in FIG. 17. The error calculating means in the above construction corresponds to the G-signal inverse wavelet transform section 905 and error calculating section 906 shown in FIG. 17. The control means in the above construction corresponds to the controller 115 shown in FIG. 17. The reference signal high-frequency emphasizing means in the above construction corresponds to the G-signal high-frequency emphasizing section 904 shown in FIG. 17. The dependent signal low-frequency emphasizing means in the above construction corresponds to the R-signal low-frequency emphasizing section 901 and B-signal low-frequency emphasizing section 902 shown in FIG. 17.

A preferable example of the signal processing apparatus according to this invention is as follows. A G-signal in the G-signal buffer 104 shown n FIG. 17 is supplied to the wavelet transform section 105 and frequency-resolved into high- and low-frequency components. Next, the normalized low-frequency component is raised to the $\beta$-th power by use of a coefficient $\beta$ in the G-signal low-frequency emphasizing section 903 to expand the dynamic range and the expanded low-frequency component and the high-frequency component are re-constructed in the G-signal inverse wavelet transform section 905. Then, the rate at which the re-constructed image is set outside a specified density range is calculated in the error calculating section 906 and the value of the coefficient $\beta$ is controlled by the controller 115 so that the error will not exceed a preset threshold value. Next, the high-frequency component is multiplied by a coefficient $\gamma$ which is derived from the coefficient $\beta$ according to a preset relational equation for each region of preset size for the adequately expanded low-frequency component and thus the high-frequency component is emphasized. Then, the normalized low-frequency components of the R-signal and B signal are raised to the $\beta$-th power in the R-signal low-frequency emphasizing section 901 and B-signal low-frequency emphasizing section 902 and thus the emphasized high-frequency components of the R-signal and B-signal are created by use of the emphasized high-frequency component of the G-signal. After this, three signals of R, G, B are re-constructed based on the emphasized high-frequency components and the low-frequency components whose dynamic range is expanded.

(Operation)

A signal of the spectral sensitivity characteristic having a large information amount (in this example, a G-signal having the largest number of pixels) among an input signal is resolved into high- and low-frequency components by the frequency-resolving means, for example, wavelet transform or DCT transform section. The low-frequency component is normalized and raised to the $\beta$-th power to expand the dynamic range, the expanded low-frequency component is used to reconstruct an original signal, and the value of the coefficient $\beta$ is controlled according to the magnitude of error. After this, the high-frequency component of the G-signal is multiplied by a coefficient $\gamma$ derived from the coefficient $\beta$ according to a preset relational equation and emphasized. Then, correlation coefficients between the low-frequency component of the G-signal and the low-frequency components of signals of other spectral sensitivity characteristics having a less information amount (in this example, R- and B-signals) are derived and multiplied by the emphasized high-frequency component of the G-signal so as to create the emphasized high-frequency components of the R- and B-signals. Further, the coefficient $\beta$ adequately controlled for the low-frequency component of the G-signal is used to expand the dynamic range of the low-frequency components of the R- and B-signals. Finally, three signals of R, G, B are re-constructed by the emphasized high-frequency components and the low-frequency components whose dynamic range is expanded.

(Effect)

An output signal of high definition with expanded dynamic range and enhanced contrast can be obtained. Since occurrence of error caused by the emphasizing process is previously checked to control the parameter and control the parameter for emphasizing process, unnatural emphasis will not tend to occur. Further, when the wavelet transform is used as the frequency-resolving means, information of neighboring pixels can be commonly used so that a reproduced image which is excellent in the continuity and high in the image quality can be obtained. When the DCT transform is used as the frequency-resolving means, the memory capacity can be reduced.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

I claim:

1. A signal processing apparatus for processing a signal in which the information amount of a signal related to at least one of a plurality of spectral sensitivity characteristics is larger than the information amount of any one of signals related to the other spectral sensitivity characteristics, comprising:

frequency resolving means for resolving the signal of the spectral sensitivity characteristic having a large information amount into high- and low-frequency components;

correlation coefficient calculating means for calculating correlation coefficients between the low-frequency component derived from said frequency resolving means and the signals of the spectral sensitivity characteristics having a small information amount;

high-frequency creation means for creating high-frequency components of the signals of the spectral sensitivity characteristics having a small information amount based on the correlation coefficients derived from said correlation coefficient calculating means and the high-frequency component derived from said frequency resolving means; and frequency synthesizing means for synthesizing the high-frequency components derived from said high-frequency creation means and the signals of the spectral sensitivity characteristics having a small information amount to output an output signal with high definition.

2. A signal processing apparatus according to claim 1, wherein the signal of the spectral sensitivity characteristic having a large information amount corresponds to a luminance signal and the signals other than the above signal having a large information amount corresponds to color signals.

3. A signal processing apparatus according to claim 1, wherein said frequency resolving means and frequency synthesizing means use the Harr function or Daubechies function as the basic function to perform the orthogonal wavelet transform or bi-orthogonal wavelet transform.

4. A signal processing apparatus according to claim 1, wherein said correlation coefficient calculating means calculates a correlation coefficient based on the color correlation between signals of a plurality of spectral sensitivity characteristics.

5. A signal processing apparatus according to claim 1, wherein said frequency resolving means and frequency synthesizing means use the orthogonal transform corresponding to one of the DCT transform, Fourier transform and Hadamard transformation for each region of preset size.

6. A signal processing apparatus for processing a signal in which the information amount of a signal related to at least one of a plurality of spectral sensitivity characteristics is larger than the information amount of any one of signals related to the other spectral sensitivity characteristics, comprising:

frequency resolving means for resolving a signal into a plurality of frequency components by using a function of local distribution as a basic function;

extraction means for extracting a frequency component corresponding to a first preset region of the signal of the spectral sensitivity characteristic having a large information amount and a frequency component corresponding to a second preset region of the signal of the other spectral sensitivity characteristic having a small information amount from the coefficients of the plurality of frequency components derived from said frequency resolving means;

similarity calculating means for calculating the degree of similarity between the frequency components of the first and second preset regions derived from said extraction means;

searching means for searching for the first preset region having the highest degree of similarity with respect to the second preset region based on the degree of similarity derived from said similarity calculating means;

high-frequency creation means for creating a high-frequency component of the second preset region based on the degree of similarity according to the high-frequency component related to the first preset region derived from said searching means; and frequency synthesizing means for synthesizing the high-frequency component derived from said high-frequency creation means and the signal of the spectral sensitivity characteristic having a small information amount to output an output signal with high definition.

7. A signal processing apparatus according to claim 6, wherein said frequency resolving means and frequency synthesizing means use the Harr function or Daubechies function as the basic function to perform the orthogonal wavelet transform or bi-orthogonal wavelet transform.

8. A signal processing apparatus for processing a signal in which the information amount of a signal related to at least one of a plurality of spectral sensitivity characteristics is larger than the information amount of any one of signals related to the other spectral sensitivity characteristics, comprising:

frequency resolving means for resolving the signal of the spectral sensitivity characteristic having a large information amount into high- and low-frequency components;

high-frequency emphasizing means for multiplying a coefficient $\alpha$ larger than 1 by the high-frequency component resolved by said frequency resolving means;

error calculating means for calculating the rate at which a signal obtained by synthesizing the high-frequency component emphasized by said high-frequency emphasizing means and the low-frequency component is set outside a preset range; and control means for controlling the value of the coefficient $\alpha$ based on the result of calculation by said error calculating means.

9. A signal processing apparatus for processing a signal in which the information amount of a signal related to at least one of a plurality of spectral sensitivity characteristics is larger than the information amount of any one of signals related to the other spectral sensitivity characteristics, comprising:

frequency resolving means for resolving the signal of the spectral sensitivity characteristic having a large information amount into high- and low-frequency components;

reference signal low-frequency emphasizing means for emphasizing the low-frequency component resolved by said frequency resolving means by raising the normalized signal thereof to the $\beta$-th power by use of a coefficient $\beta$;

error calculating means for synthesizing the low-frequency component emphasized by said reference signal low-frequency emphasizing means and the high-frequency component and calculating the rate at which the synthesized signal is set outside a preset range;

control means for controlling the coefficient $\beta$ based on the result of calculation by said error calculating means;

reference signal high-frequency emphasizing means for dividing the high-frequency component resolved by said frequency resolving means into preset regions and multiplying the divided high-frequency component of each region by a coefficient $\gamma$ derived from the coefficient $\beta$ used in said reference signal low-frequency emphasizing means according to a preset relational expression; and dependent signal low-frequency emphasizing means for emphasizing the signal of the spectral sensitivity characteristic having a small information amount by raising the normalized signal thereof to the $\beta$-th power.

* * * * *